US012163645B2

(12) United States Patent
Huang et al.

(10) Patent No.: US 12,163,645 B2
(45) Date of Patent: Dec. 10, 2024

(54) FLUSH MOUNT LIGHTING FIXTURE

(71) Applicant: NICOR, INC., Albuquerque, NM (US)

(72) Inventors: Lina Huang, Dongguan (CN); Jiabin Yu, Zhongshan (CN); Yunhong Hu, Zhongshan (CN)

(73) Assignee: NICOR, INC., Albuquerque, NM (US)

( * ) Notice: Subject to any disclaimer, the term of this patent is extended or adjusted under 35 U.S.C. 154(b) by 0 days.

(21) Appl. No.: 18/129,313

(22) Filed: Mar. 31, 2023

(65) Prior Publication Data

US 2024/0328607 A1 Oct. 3, 2024

(51) Int. Cl.

| | |
|---|---|
| ***F21V 21/04*** | (2006.01) |
| ***F21V 3/04*** | (2018.01) |
| ***F21V 7/04*** | (2006.01) |
| ***F21V 17/10*** | (2006.01) |
| ***F21V 17/16*** | (2006.01) |
| ***F21V 23/04*** | (2006.01) |
| ***F21Y 105/10*** | (2016.01) |
| ***F21Y 115/10*** | (2016.01) |

(52) U.S. Cl.

CPC .............. *F21V 21/04* (2013.01); *F21V 3/049* (2013.01); *F21V 7/041* (2013.01); *F21V 17/105* (2013.01); *F21V 17/16* (2013.01); *F21V 23/04* (2013.01); *F21Y 2105/10* (2016.08); *F21Y 2115/10* (2016.08)

(58) Field of Classification Search

CPC .......... F21V 21/04; F21V 3/049; F21V 7/041; F21V 17/105; F21V 17/16; F21V 23/04; F21Y 2105/10; F21Y 2115/10; F21S 8/02; F21S 8/026

See application file for complete search history.

(56) References Cited

U.S. PATENT DOCUMENTS

| | | | | |
|---|---|---|---|---|
| 5,457,617 | A * | 10/1995 | Chan | F21V 21/30 362/148 |
| 10,091,855 | B2 * | 10/2018 | Van Winkle | H05B 45/20 |
| 11,317,492 | B2 * | 4/2022 | Jeswani | H05B 45/00 |
| 11,592,170 | B2 * | 2/2023 | Hawkins | F21V 29/75 |
| 2009/0097262 | A1 * | 4/2009 | Zhang | F21V 29/713 362/364 |
| 2019/0230424 | A1 * | 7/2019 | Christie | H04R 1/026 |

FOREIGN PATENT DOCUMENTS

| | | | |
|---|---|---|---|
| WO | WO 2015163556 | * 10/2015 | F21S 8/026 |

OTHER PUBLICATIONS

WO 2015/163556, Oct. 29, 2015, Im et al., English Translation (Year: 2015).*

* cited by examiner

*Primary Examiner* — Peggy A Neils

(74) *Attorney, Agent, or Firm* — LOZA & LOZA, LLP; Richard H. Krukar

(57) ABSTRACT

A flush mount lighting fixture can incorporate aspects that provide reconfigurability and convenience. Selector switches can provide a wide selection of illumination levels and color temperatures. The switches may be inaccessible while the fixture is installed to thereby prevent unwanted adjustment. A magnetically attached faceplate is easy to install, replace, adjust, and change for other faceplates. A top diffuser may be interchangeable with a wall wash insert. The top diffuser can produce a lighting pattern that is circularly symmetric with a fixture axis of the fixture. The wall wash insert produces a lighting pattern that is asymmetrical and may be offset from the fixture axis of the fixture.

18 Claims, 17 Drawing Sheets

FLUSH MOUNT LIGHTING FIXTURE

TECHNICAL FIELD

Embodiments are related to LED lighting, light fixtures, solid state lighting, LED lighting power supplies, and to a recessed downlight light fixture mountable into a standard, commercially available junction box resulting in a flush mounted arrangement.

BACKGROUND

Lighting systems have been evolving at a rapid pace with moves from incandescent, fluorescent, and gas discharge to light emitting diodes (LEDs). LEDs have been improving in efficiency, thermal management, and cost. Similarly, the power supplies, a.k.a. drivers, which drive the LEDs, have seen improvements in efficiency, thermal management and cost. In general, residential and commercial lighting is transitioning to the use of LED lighting technologies.

A flush-mount lighting fixture can include all the structural and functional elements of a lighting fixture that may be attached to a recessed junction box and that sits flush with the plane of the ceiling or any other supporting structure. Flush mount lighting fixtures are similar to hanging light fixtures and chandeliers in that they can be coupled to the electrical system of a building through a previously installed junction box. Flush mount lighting fixtures differ from hanging lighting fixtures and chandeliers in that flush mount fixtures do not comprise cables, chains, or other attachment or hanging elements which provide an appearance of a freely-hanging fixture.

A junction box can be mounted above the ceiling plane and provides access to electrical wiring for connection to a lighting fixture as well as components for securely mounting the junction box to ceiling beams or other fixed structural building elements. Accordingly, in addition to providing the electrical power source to a lighting fixture, the lighting fixture is also securely held in place via its engagement to the junction box.

BRIEF SUMMARY

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

One aspect of the subject matter described in this disclosure can be implemented by a system. The system can include a housing, a body attached to the housing, a bottom end of the body that is inside the housing, a lighting circuit on a circuit board that is located at the bottom end of the body and that is inside the housing, a plurality of light emitting diodes that are included in the lighting circuit and are mounted on the circuit board, a power selector switch that is electrically connected to the lighting circuit, and a color temperature selector switch that is electrically connected to the lighting circuit, wherein light emitted from the light emitting diodes travels into the bottom end of the body and out of a top end of the body, the power selector switch selects one of a plurality of illumination levels of the light emitting diodes, the light is emitted at least two of the illumination levels, and the color temperature selector switch selects one of a plurality of color temperatures of the light emitting diodes.

Another aspect of the subject matter described in this disclosure can be implemented by a system. The system can include a housing, a body attached to the housing, a bottom end of the body that is inside the housing, a lighting circuit on a circuit board that is located at the bottom end of the body and that is inside the housing, a plurality of light emitting diodes that are included in the lighting circuit and are mounted on the circuit board, and a removable wall wash insert installed in the body, wherein the removable wall wash insert produces an asymmetrical lighting pattern, rotating the removable wall wash insert inside the body moves the asymmetrical lighting pattern, and light emitted from the light emitting diodes travels into the bottom end of the body and out of a top end of the body.

Yet another aspect of the subject matter described in this disclosure can be implemented by a system. The system can include a housing, a body attached to the housing, a bottom end of the body that is inside the housing, a lighting circuit on a circuit board that is located at the bottom end of the body and that is inside the housing, a plurality of light emitting diodes that are included in the lighting circuit and are mounted on the circuit board, and a faceplate that is magnetically attached at a top end of the body, wherein light emitted from the light emitting diodes travels into the bottom end of the body and out of the top end of the body, and the light emitted by the light emitting diodes passes through a lighting aperture in the faceplate.

In some implementations of the methods and systems, the power selector switch includes a power selector switch body and a power selector actuator, the color temperature selector switch includes a color temperature selector switch body and a color selector actuator, the power selector switch body is inside the housing, and the color temperature selector switch body is inside the housing. In some implementations of the methods and systems, a capacitor, a fuse, and an integrated circuit are mounted on the circuit board, wherein the capacitor, the fuse, and the integrated circuit are located between the body and the circuit board, wherein the body is formed from a material that meets UL94 5VA, wherein the body is a conical reflector body, and wherein the bottom end of the body is narrower than the top end of the body. In some implementations of the methods and systems, the body includes a plurality of circuit board standoffs that include a standoff finned section, a standoff bottom section and a standoff mounting hole, the standoff finned section includes a standoff fin, the standoff bottom section passes through a circuit board mounting hole in the circuit board, the standoff finned section is too large to pass through the circuit board mounting hole, and the body is attached to the housing by a screw threaded into the standoff mounting hole.

In some implementations of the methods and systems, the system further includes a magnet that magnetically attaches a faceplate to the body, and a magnet holder in the body that holds the magnet, wherein the magnet is circularly symmetric about a magnet axis, the magnet has a narrow magnet section and a wide magnet section, the narrow magnet section is positioned in a magnet holder clear opening of the magnet holder, and the wide magnet section is too large to fit into the magnet holder clear opening. In some implementations of the methods and systems, the system further includes a first faceplate that magnetically attaches at the top end of the body, and a second faceplate that magnetically attaches at the top end of the body, wherein the first faceplate and the second faceplate are interchangeable faceplates. In some implementations of the methods and systems, the light from the light emitting diodes reflects from an inner surface of the body to produce a circularly symmetrical lighting pattern when the removable wall wash insert is outside the body. In some implementations of the methods and systems, the system further includes a removable wall wash insert that includes a plurality of body clips configured for attaching the removable wall wash insert to the body, a wall wash diffuser that is attached to the removable wall wash insert by the body clips, wherein installing the removable wall wash insert into the body produces an asymmetrical lighting pattern, and rotating the removable wall wash insert inside the body moves the asymmetrical lighting pattern.

In some implementations of the methods and systems, the system further includes a top diffuser that includes a top diffuser breach and a plurality of top diffuser tabs that include a plurality of diffuser wedges, wherein the top diffuser breach is configured for pulling the top diffuser free from the body, the top diffuser tabs are configured for attaching the top diffuser to a plurality of diffuser indents in the body, the diffuser indents include a plurality of body wedges, the diffuser wedges and the body wedges are angled such that the diffuser wedges slide on the body wedges when the top diffuser is pressed into the body, the removable wall wash insert is interchangeable with the top diffuser, and the light from the light emitting diodes reflects from an inner surface of the body and out of the top diffuser to produce a circularly symmetrical lighting pattern when the top diffuser is installed in the body.

In some implementations of the methods and systems, the system further includes a capacitor, a fuse, and an integrated circuit that are mounted on the circuit board and located between the body and the circuit board The system can also include a plurality of interchangeable faceplates that magnetically attach at the top end of the body, a magnet holder in the body that holds a magnet that is positioned to hold a one of the interchangeable faceplates to the top end of the body, a wall wash diffuser attached to a bottom of the removable wall wash insert, and a body flange that is included in the body and that extends no more than 0.3 inches out of the housing, wherein the power selector switch includes a power selector switch body and a power selector actuator, the color temperature selector switch includes a color temperature selector switch body and a color selector actuator, the power selector switch body is inside the housing, the color temperature selector switch body is inside the housing, the body is formed from a material that meets UL94 5VA, the body is a conical reflector body, the bottom end of the body is narrower than the top end of the body, the body can include a plurality of circuit board standoffs that include a standoff finned section, a standoff bottom section and a standoff mounting hole, the standoff finned section includes a standoff fin, the standoff bottom section passes through a circuit board mounting hole in the circuit board, the standoff finned section is too large to pass through the circuit board mounting hole, the body is attached to the housing by a screw threaded into the standoff mounting hole, the magnet is circularly symmetric about a magnet axis, the magnet has a narrow magnet section and a wide magnet section, the narrow magnet section is positioned in a magnet holder clear opening of the magnet holder, the wide magnet section is too large to fit into the magnet holder clear opening; and the light emitted by the light emitting diodes passes through a lighting aperture in the one of the interchangeable faceplates when the one of the interchangeable faceplates is attached at the top end of the body.

In some implementations of the methods and systems, the system further includes a top diffuser, wherein the removable wall wash insert is interchangeable with the top diffuser, and the light from the light emitting diodes reflects from an inner surface of the body and out of the top diffuser to produce a circularly symmetrical lighting pattern when the top diffuser is installed in the body. In some implementations of the methods and systems, the system further includes a power selector switch that is electrically connected to the lighting circuit, and a color temperature selector switch that is electrically connected to the lighting circuit, wherein the power selector switch selects an illumination level of the light emitting diodes, and the color temperature selector switch selects a color of the light emitting diodes. In some implementations of the methods and systems, the system further includes a faceplate that is magnetically attached at the top end of the body, wherein the light emitted by the light emitting diodes passes through a lighting aperture in the faceplate.

In some implementations of the methods and systems, the system further includes a magnet holder in the body that holds a magnet that attaches the faceplate to the body. In some implementations of the methods and systems, the system further includes a second faceplate that magnetically attaches at the top end of the body, wherein the faceplate and the second faceplate are interchangeable faceplates. In some implementations of the methods and systems, the system further includes a removable wall wash insert configured for installation into the body, wherein installing the removable wall wash insert into the body produces an asymmetrical lighting pattern, and rotating the removable wall wash insert inside the body moves the asymmetrical lighting pattern. In some implementations of the methods and systems, a top diffuser that is interchangeable with the removable wall wash insert.

These and other aspects will become more fully understood upon a review of the detailed description, which follows. Other aspects, features, and details will become apparent to those of ordinary skill in the art, upon reviewing the following description of specific examples in conjunction with the accompanying figures. While features may be discussed relative to certain examples and figures below, other examples can include one or more of the advantageous features discussed herein. In other words, while one or more examples may be discussed as having certain advantageous features, one or more of such features may also be used in other examples. In similar fashion, while examples may be discussed below as devices, systems, or methods the examples can be implemented in various devices, systems, and methods.

BRIEF DESCRIPTION OF THE DRAWINGS

Throughout the description, similar reference numbers may be used to identify similar elements.

DETAILED DESCRIPTION

It will be readily understood that the examples as generally described herein and illustrated in the appended figures could be arranged and designed in a wide variety of different configurations. Thus, the following more detailed description of various examples, as represented in the figures, is not intended to limit the scope of the present disclosure, but is merely representative of various aspects. While the various aspects are presented in drawings, the drawings are not necessarily drawn to scale unless specifically indicated.

Systems and methods that implement aspects of the examples may have various differing forms. The described systems and methods are to be considered in all respects only as illustrative and not restrictive. The scope of the claims is, therefore, indicated by the claims themselves rather than by this detailed description. All changes which come within the meaning and range of equivalency of the claims are to be embraced within their scope.

Reference throughout this specification to features, advantages, or similar language does not imply that any system or method that implements each and every aspect may be realized. Rather, language referring to the features and advantages is understood to mean that a specific feature, advantage, or characteristic described in an example may be implemented in or by at least one system or method. Thus, discussions of the features and advantages, and similar language, throughout this specification may, but do not necessarily, refer to the same systems or methods.

Furthermore, the described features, advantages, characteristics, and aspects may be combined in any suitable manner in one or more systems or methods. One skilled in the relevant art will recognize, in light of the description herein, that some aspects can be implemented without also implementing other aspects.

Figure 1:
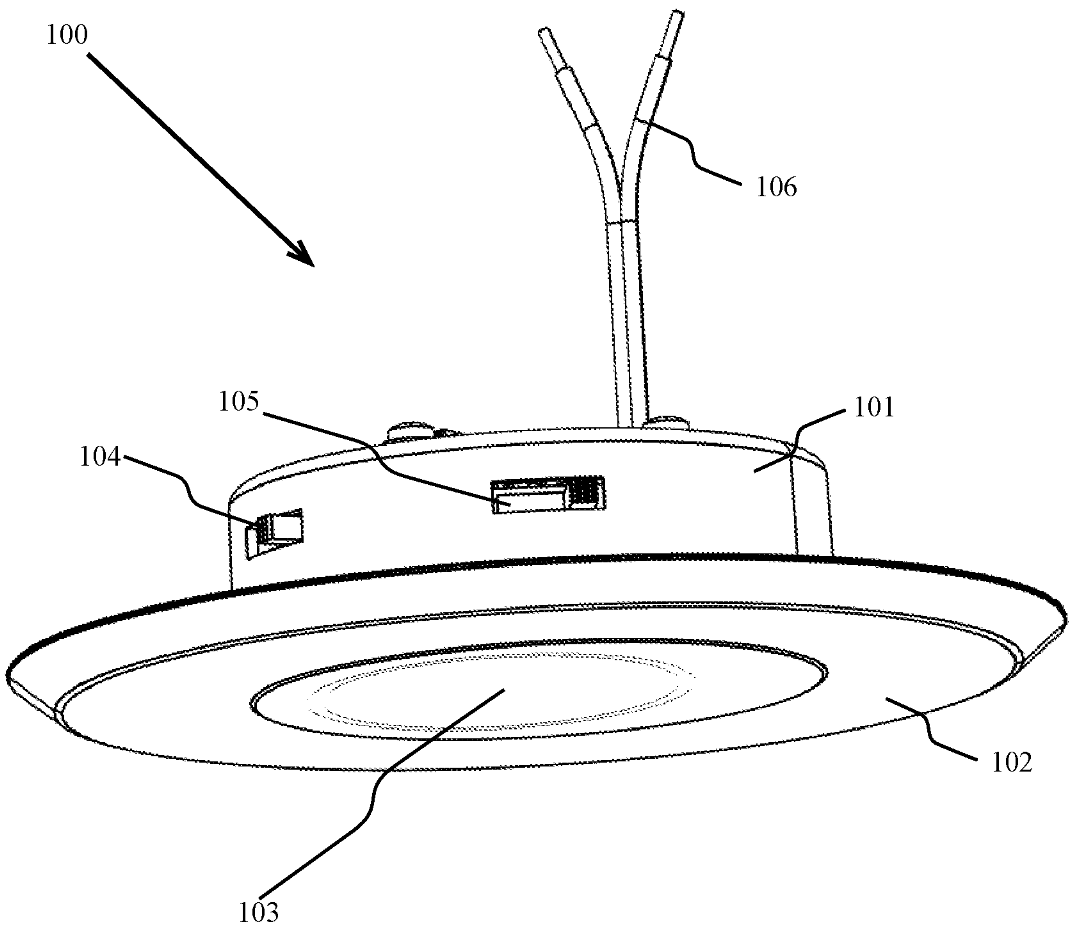
FIG. 1 illustrates a lighting fixture that can be installed flush against a ceiling, according to some aspects.

FIG. 1 illustrates a lighting fixture 100 that can be installed flush against a ceiling, according to some aspects. The lighting fixture 100 receives electrical power through power lines 106 that can be connected to an external power source such as the mains power that is commonly available in commercial and residential buildings. In the United States, mains power is typically alternating current (AC) power that is nominally 120 V at 60 Hz AC. Internally, the supplied electrical power is conditioned to run internal circuitry that includes a light emitting diode (LED), usually many LEDs. The LEDs produce light. The light can pass through a diffuser 103 to thereby exit the lighting fixture and provide illumination. The lighting fixture 100 has a housing 101 and a removable faceplate 102. The internal circuitry and other elements of the lighting fixture are inside the housing. The lighting fixture 100 has switches for controlling the characteristics of the light produced by the lighting fixture. A power selector switch 104 can be used to select the lighting fixture's illumination level (e.g., 550 lumens, 700 lumens, 900 lumens, etc.). A color temperature selector switch 105 can be used to select the color temperature of the light produced by the lighting fixture (e.g., 2700K, 3000K, 3500K, 4000K, 5000K, etc.). Those practiced in lighting are familiar with the color temperature of light that is produced naturally or artificially. The lighting fixture is sized and dimensioned for installation in a junction box. The switches are not accessible when the lighting fixture is installed in a junction box. As such, the desired illumination level and color temperature are set before installation. It therefore stands to reason that the power selector switch should not have an "off" position. Light may be emitted from the LEDs at every one of the illumination levels selected by the power selector switch. The switches may be accessed from outside the housing 101. For example, FIG. 1 shows the actuators of the switches extending out of the housing.

Figure 2:
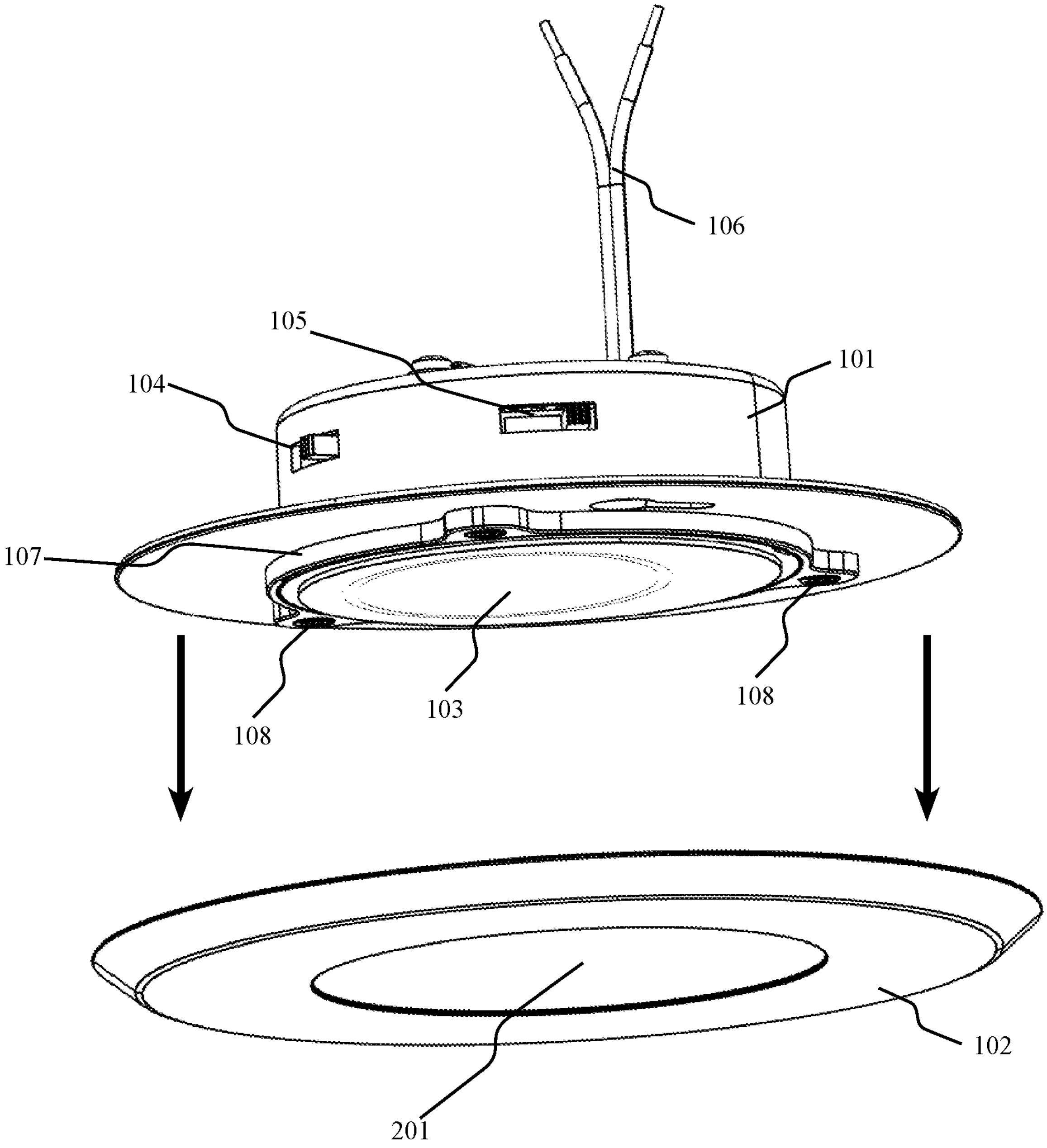
FIG. 2 illustrates the lighting fixture of FIG. 1 with the removable faceplate detached, according to some aspects.

FIG. 2 illustrates the lighting fixture 100 of FIG. 1 with the removable faceplate 102 detached, according to some aspects. The lighting fixture has a body inside the housing 101 and that body has a body flange 107. The body flange 107 incorporates magnet holders that hold magnets 108. The faceplate may be formed from or include a material that is magnetically attracted to the magnets 108 such the magnets magnetically attach the removable faceplate to the lighting fixture. The magnetically attached removable faceplate is much easier to remove, replace, or adjust than a faceplate that is attached using fasters or some other mechanical mechanism. The faceplate 102 has a lighting aperture 201 through which light from the LEDs can exit the lighting fixture 100. The drawings show magnets that are visible through holes in the body flange. Those holes may be smaller than the magnets such that the magnets are held within the body and do not fall through the holes. Alternatively, the magnets may be located behind a thinned area of the body flange 107 such that the faceplate is magnetically attached to the lighting fixture and the magnets are not visible. In yet another alternative, the magnets may be attached to the housing.

Figure 3:
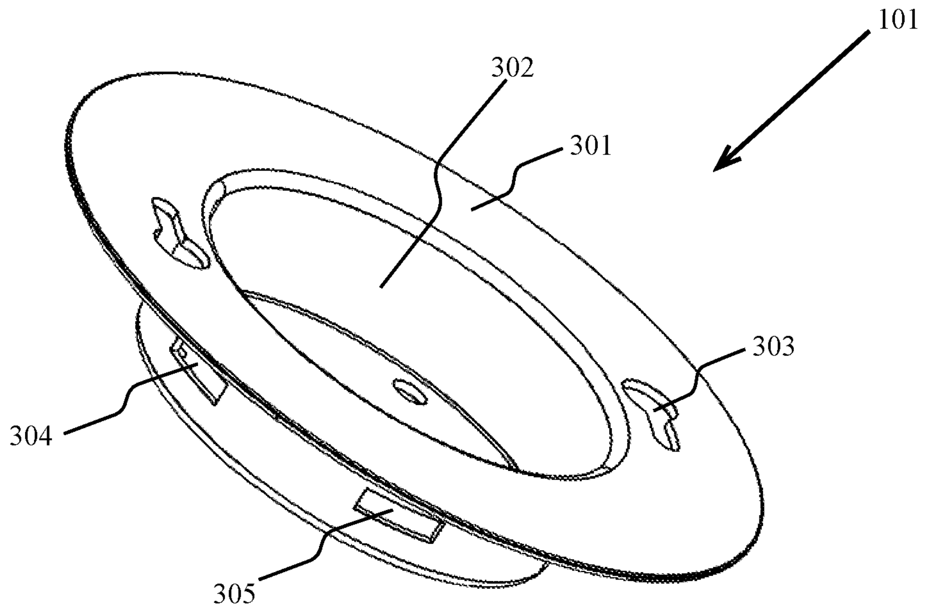
FIG. 3 illustrates the housing of the lighting fixture of FIG. 1, according to some aspects.

FIG. 3 illustrates the housing 101 of the lighting fixture of FIG. 1, according to some aspects. The housing 101 may be formed from a single piece of metal or a single piece of plastic via stamping, molding, or machining processes. The housing has a housing flange 301 that has mounting slots 303. Fasteners (e.g., screws, bolts, etc.) passing through the mounting slots 303 can attach the lighting fixture 100 to a junction box. The housing 101 has a housing interior 302 in which other parts of the lighting fixture may be located when the lighting fixture is assembled. The housing 101 has apertures through which switch actuators can pass or be accessed. The power selector actuator of the power selector switch may pass through the second switch aperture 305. The color selector actuator of the color temperature selector switch may pass through the first switch aperture 304.

Figure 4:
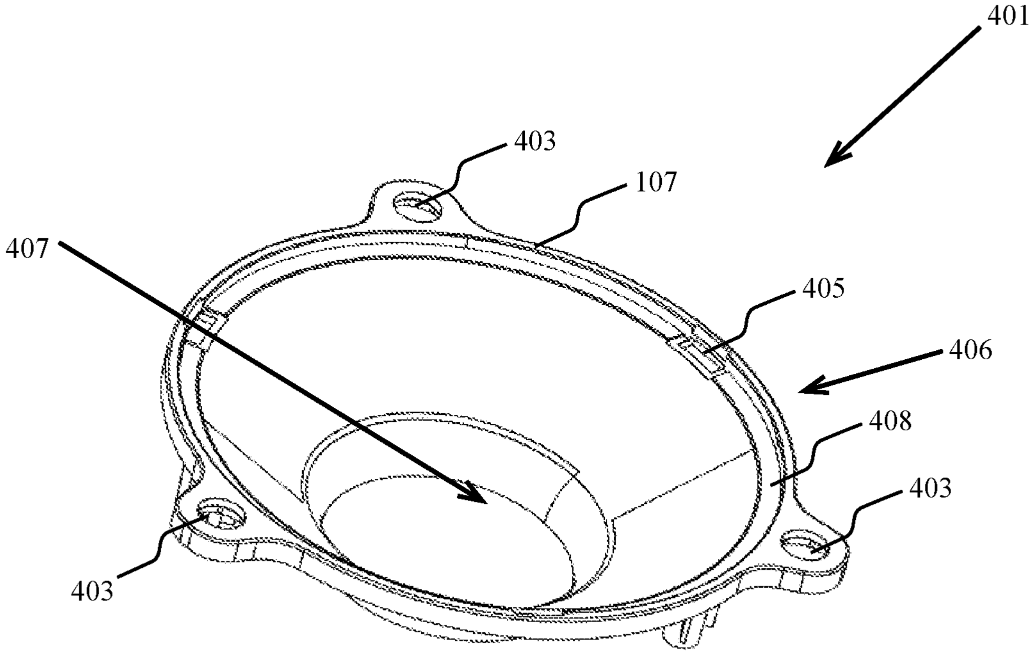
FIG. 4 illustrates the body of the lighting fixture of FIG. 1, according to some aspects.

FIG. 4 illustrates the body 401 of the lighting fixture of FIG. 1, according to some aspects. The body 401 is illustrated as a conical reflector body that has a circularly symmetric cone section. The body flange 107 of the body 401 may lay flush against the housing flange when the body is installed in the housing. The body flange 107 has magnet holders 403 that hold the magnets 108 that magnetically attach faceplates to the lighting fixture. The body has a top end 406 and a bottom end 407. It is understood that the top end 406 of the body will be positioned lower than the bottom end 407 of the body when the lighting fixture is installed in a ceiling to illuminate a room below the ceiling. The body 401 has diffuser indents 405 and a body ridge 408. The diffuser indents 405 are shaped such that diffuser detents on the top diffuser 103 fit into the diffuser indents 405 to thereby attach the top diffuser to the body. The body ridge 408 runs circumferentially around the inside edge of the body flange. The body ridge 408 has two purposes. One purpose is that the top diffuser 103 fits into the body ridge. Another purpose is that a wall wash insert that can be inserted into the body has an insert rim that fits into the body ridge such that one end of the wall wash insert is held in position within the body by the body ridge 408.

Figure 5:
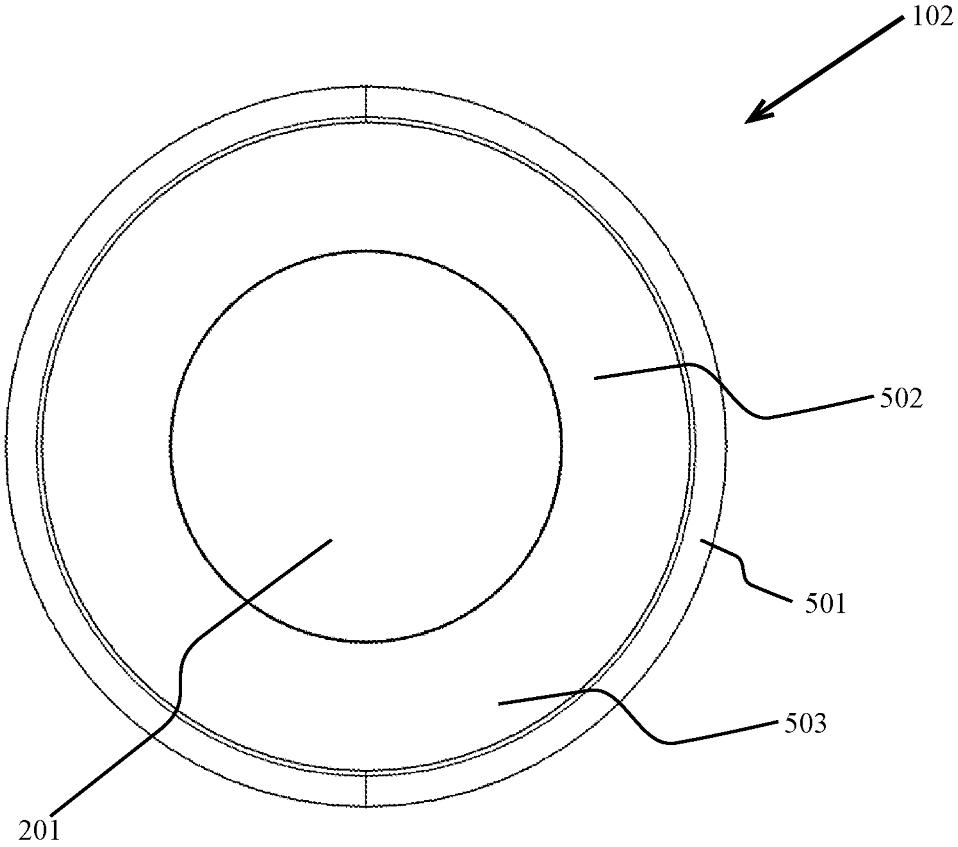
FIG. 5 is a diagram that illustrates a bottom view of a removable faceplate that is circular, according to some aspects.
Figure 6:
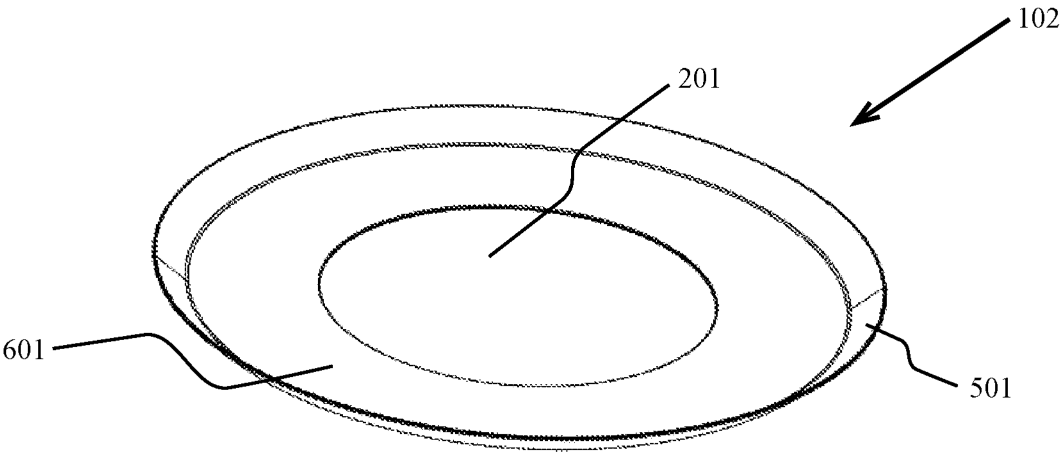
FIG. 6 is a diagram that illustrates an offset top view of the removable faceplate of FIG. 5, according to some aspects.

FIG. 5 is a diagram that illustrates a bottom view of a removable faceplate 102 that is circular, according to some aspects. FIG. 6 is a diagram that illustrates an offset top view of the removable faceplate of FIG. 5, according to some aspects. The faceplate illustrated in FIG. 5 and FIG. 6 is a circularly symmetric faceplate. The outside area of the removable faceplate 102 is an upturned faceplate rim 501. The faceplate 102 has a lighting aperture 201 that can be a clear hole through which light can exit the lighting fixture. The faceplate flat 502 is the section between the faceplate rim 501 and the lighting aperture 201. The faceplate flat 502 has a faceplate flat inner surface 601 and a faceplate flat outer surface 503. The faceplate flat outer surface 503 is visible in FIG. 5. The faceplate flat inner surface 601 is visible in FIG. 6. It is the faceplate flat that is magnetically attracted to the magnets 108 and magnetically held to the lighting fixture at the top end of the body. As such, the removable faceplate can be formed from a single piece of material that is magnetically attracted to the magnets, such as iron, many steels, or other magnets. Alternatively, the removable faceplate can be formed of two materials that are joined or fastened wherein one of the materials is magnetically attracted to the magnets.

Figure 7:
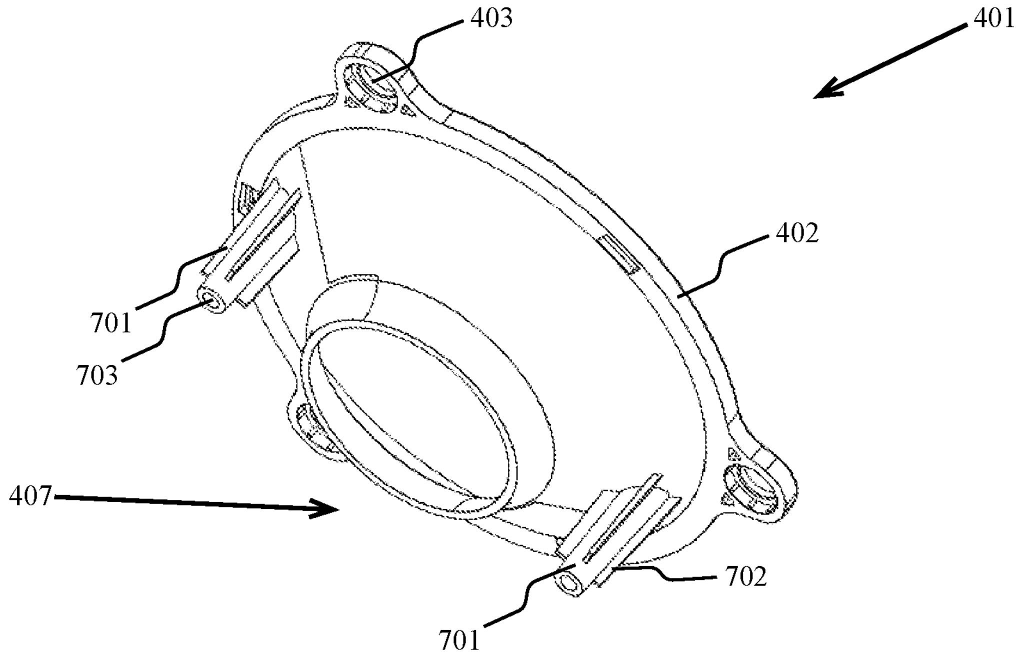
FIG. 7 is a diagram that illustrates a bottom view of the body illustrated in FIG. 4, according to some aspects.

FIG. 7 is a diagram that illustrates a bottom view of the body 401 illustrated in FIG. 4, according to some aspects. The magnet holders 403 can be seen inside of the body flange 402. The body flange 402 may lay flush against the housing flange. Magnets may be held inside the magnet holders 403 by friction. Magnets may fit inside the magnet holders and may be held inside the magnet holders by the housing flange on one side and by narrowed sections of the magnet holders on the other side. The magnets cannot fit through the narrowed end of the magnet holder. The magnets may be formed with a narrowed end such that a portion of the magnets pass through the flange and may contact the faceplate. The body has mounting legs 701 that include circuit board standoffs and mounting holes 703. The ends of the mounting legs can pass through holes in the circuit board until the circuit board standoffs rest against the circuit board. The circuit board and body may then be placed in the housing. Screws passing through holes in the housing 101 can be threaded into the mounting holes 703. As such, the mounting legs are used for attaching the circuit board and the body to the lighting fixture.

Figure 8:
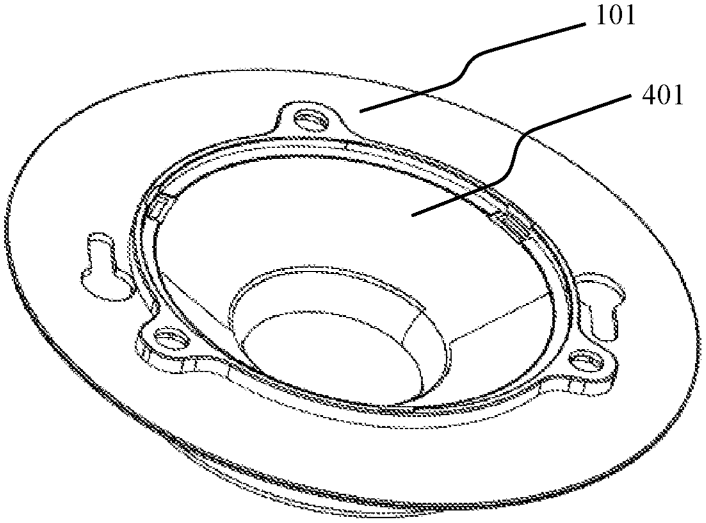
FIG. 8 is a diagram that illustrates the body installed in the housing, according to some aspects.

FIG. 8 is a diagram that illustrates the body 401 installed in the housing 101, according to some aspects. The body flange is flush against the housing flange. The thickness of the body flange provides clearance for the heads of fasteners that pass through the mounting slots 303 and attaching the housing 101 to a junction box. Based on the sizes and designs of fasteners that may be used to attach the housing to a junction box, 0.3 inches of clearance is sufficient. As such, the body flange may extend no more than 0.3 inches out of the housing. The height of the faceplate rim 501 relative to the faceplate flat 502 may allow the faceplate flat to touch body flange while the outside edge of the faceplate rim is coplanar with the housing flange.

Figure 9:
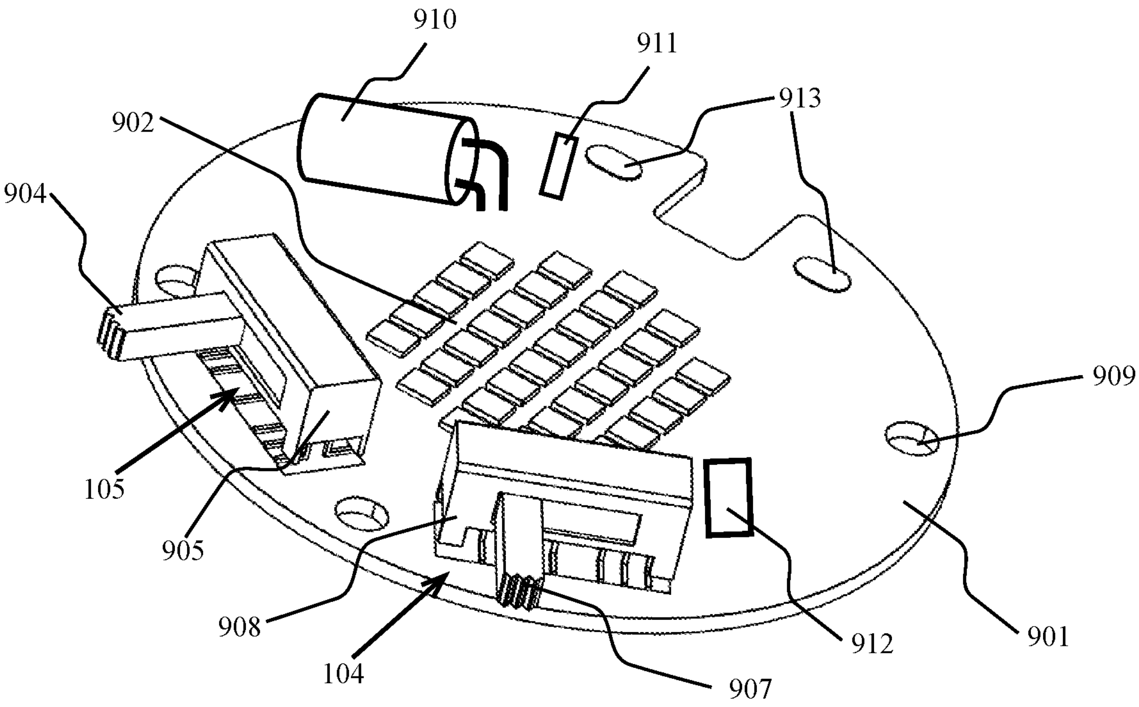
FIG. 9 is a diagram that illustrates a circuit board for a lighting circuit, according to some aspects.

FIG. 9 is a diagram that illustrates a circuit board 901 for a lighting circuit 1001, according to some aspects. Numerous LEDs 902 are included in the lighting circuit 1001. The LEDs are attached to the circuit board and are positioned to emit light into the bottom end of the body when the circuit board and body are installed in the housing. The circuit board 901 has circuit board mounting holes 909 through which the ends of the mounting legs can pass. The power selector switch 104 and the color temperature selector switch are attached to the circuit board 901. The power selector switch 104 is positioned such that the power selector switch body 908 can be inside the housing 101 and the power selector actuator 907 can extend through an aperture in the housing. The color temperature selector switch 105 is positioned such that the color temperature selector switch body 905 can be inside the housing 101 and the color selector actuator 904 can extend through an aperture in the housing. The power selector switch 104 can include leads or wires that are attached to the circuit board 901 such that the power selector switch 104 is electrically connected to the lighting circuit 1001. The color temperature selector switch 105 can include leads or wires that are attached to the circuit board 901 such that the color temperature selector switch 105 is electrically connected to the lighting circuit 1001. For example, the switch leads can be soldered to the circuit board. All of the components such as the switches 904, 907, LEDs 902, capacitor 910, fuse 911, and integrated circuit 912 are on one side of the circuit board 901. The power lines 106 can be soldered to power input pads 913. The circuit board 901 is a single sided circuit board that has one side that is flat and unpopulated with components. The flat side can rest against the inner surface of the housing 101.

Underwriter's Laboratories (UL) has established and published standards for various products and materials. UL94 is a plastics flammability standard. Materials that meet the UL94 5VA must stop burning with 60 seconds on a vertical specimen, no drips are allowed, and plaque specimens cannot develop a hole. Those familiar with consumer electronic product design are familiar with UL94 5VA. The body 401 can be molded from a thermoplastic material that is UL94 5VA. The LEDs 902 are placed in the center of the circuit board 901 and the other electronic components are place outside the center. As such that the LEDs are inside the bottom end aperture and the (e.g., capacitor 910, fuse 911, and integrated circuit 912) are outside the bottom end aperture. The bottom end aperture is the aperture at the bottom end 407 of the body 401. The body therefore shields the electronic parts on the circuit board except for the LEDs. The diffuser can be thinner and more transparent because the body is formed from UL94 5VA material and shields the electronic components on the circuit board except for the LEDs 902. The lighting fixture 100 can therefore pass UL certification with a diffuser that is 2.7 mm thick.

Figure 10:
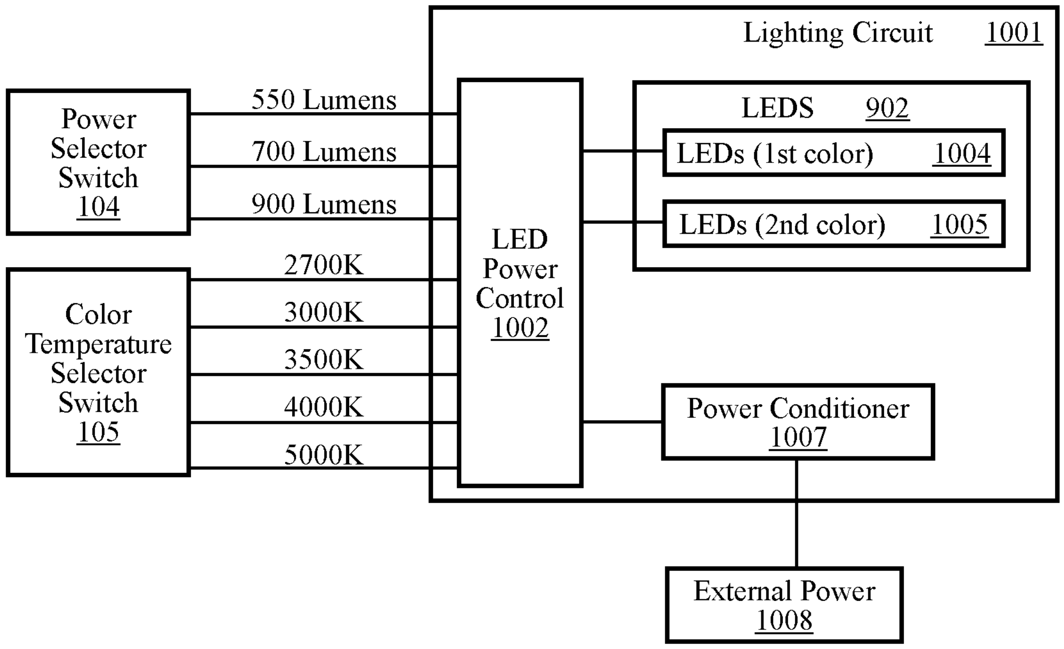
FIG. 10 is a high level conceptual diagram that illustrates a lighting circuit, according to some aspects.

FIG. 10 is a high level conceptual diagram that illustrates a lighting circuit 1001, according to some aspects. The lighting circuit 1001 can be on the circuit board 901 illustrated in FIG. 901. The lighting circuit 1001 can include a power conditioner 1007 that receives external power, such as mains power, and produces power that is conditioned for use by LED power control 1002 and the LEDs 902. Such power conditioners are known to those practiced in the art. The LED power control can receive signals from the power selector switch 104 and the color temperature selector switch 105. The signals can be voltage levels or some other signal that can be read by the LED power control 1002. The power selector switch 104 selects an illumination level of the light emitting diodes. The power selector switch 104 is illustrated to be selecting one of three different illumination levels: 550 lumens, 700 lumens, and 900 lumens. Based on the signals from the power selector switch 104, the LED power control 1002 can supply different amounts of power to the LEDs 902 to thereby control the illumination level. The color temperature selector switch 105 selects a color of the light emitting diodes. The color can be specified as a color temperature. The color temperature selector switch 105 is illustrated as selecting one of five different color temperatures: 2700K, 3000K, 3500K, 4000K, and 5000K. Based on the signals from the color temperature selector switch 105, the LED power control 1002 can supply different amounts of power to different groups of LEDs. The LEDs 902 is illustrated with two groups of LEDs: first color LEDs 1004, second color LEDs 1005. The different groups of LEDs can produce light of different colors. Different color temperatures can be produced by selectively powering the groups of LEDs. As such, the LED power control can power the LEDs such that the LEDs produce the light of the desired color temperature and at the desired illumination level.

Figure 11:
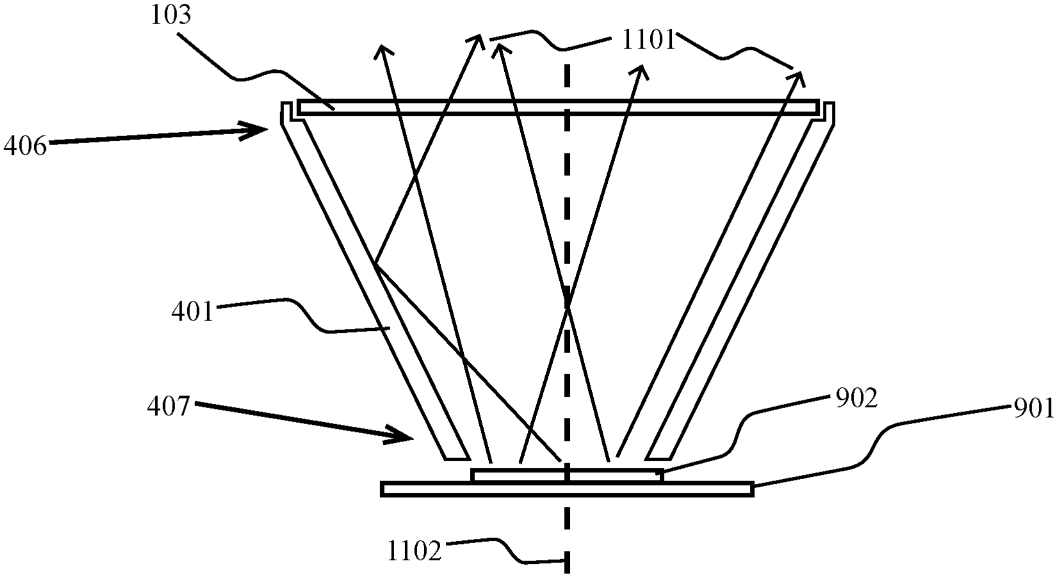
FIG. 11 is a diagram that illustrates light emitted from the LEDs traveling into the bottom end of the body and out of a top end of the body, according to some aspects.

FIG. 11 is a diagram that illustrates light 1101 emitted from the LEDs 902 traveling into the bottom end 407 of the body and out of a top end 406 of the body, according to some aspects. The body 401 is illustrated as a conical reflector body that has a cone shape and a reflective inner surface that reflects light from the diodes out of the lighting fixture. The cone shape is illustrated with the bottom end 407 of the body being narrower than the top end 406 of the body. A top diffuser 103 is shown installed in the lighting fixture such that the LED light passes through the top diffuser in order to exit the lighting fixture. In the example of FIG. 11, the light from the LEDs travels into the bottom end of the body, travels through the body (possibly reflecting off a reflective inner surface), and passes through the top diffuser 103. The lighting fixture can have a fixture axis 1102 around which certain elements are circularly symmetric. The conical reflector body, the top diffuser, the body ridge 408, and the bottom end 407 of the body can be circularly symmetric around the fixture axis. The lighting pattern produced by the lighting fixture can be a circularly symmetric lighting pattern that is circularly symmetric around the fixture axis when the conical reflector body and the top diffuser are circularly symmetric around the fixture axis.

Figure 12:
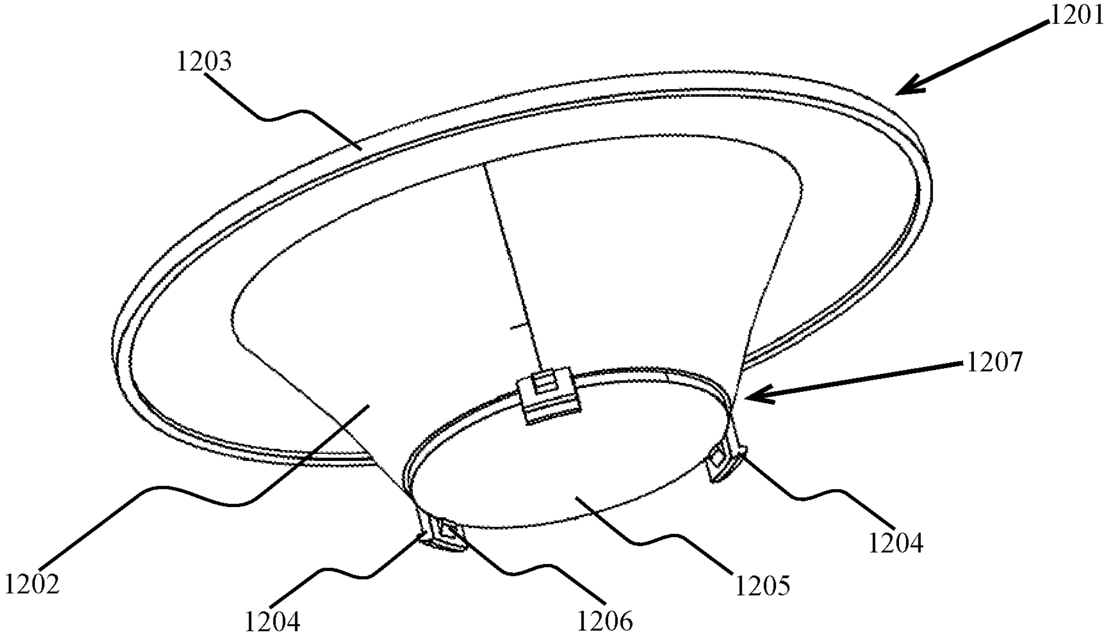
FIG. 12 is a diagram that illustrates a wall wash insert, according to some aspects.

FIG. 12 is a diagram that illustrates a removable wall wash insert 1201, according to some aspects. The removable wall wash insert 1201 is configured for installation in the body 401 and may be installed in the body 401 instead of the top diffuser 103. The removable wall wash insert 1201 can have an insert rim 1203 that has the same radius as the top diffuser 103 and, when installed in the body 401, is circularly symmetric around the fixture axis 1102. As such, the insert rim of the removable wall wash insert fits into the body ridge 408 of the body and the removable wall wash insert can rotate within the body. The removable wall wash insert 1201 can have body clips 1204 that clip onto the bottom end of the body. The bottom end of the body being circularly symmetric, the removable wall wash insert can rotate 360 degrees or more around the fixture axis 1102 when installed in the body 401. The removable wall wash insert 1201 is not circularly symmetric because the removable wall wash insert has an asymmetrical cone 1202. When the removable wall wash insert is installed, the light from the LEDs passes through the removable wall wash insert before exiting the lighting fixture. The inner surface of the asymmetrical cone reflects the light from the LEDs to produce an asymmetrical pattern. A wall wash diffuser 1205 may be installed at the narrow end 1207 of the asymmetrical cone 1202 to thereby diffuse the LED light before the LED light passes into the asymmetrical cone. The body clips 1204 can have diffuser clips 1206 that hold the diffuser at the narrow end. With the wall wash diffuser installed the removable wall wash insert can rotate 360 degrees or more around the fixture axis 1102 when installed in the body 401.

Figure 13:
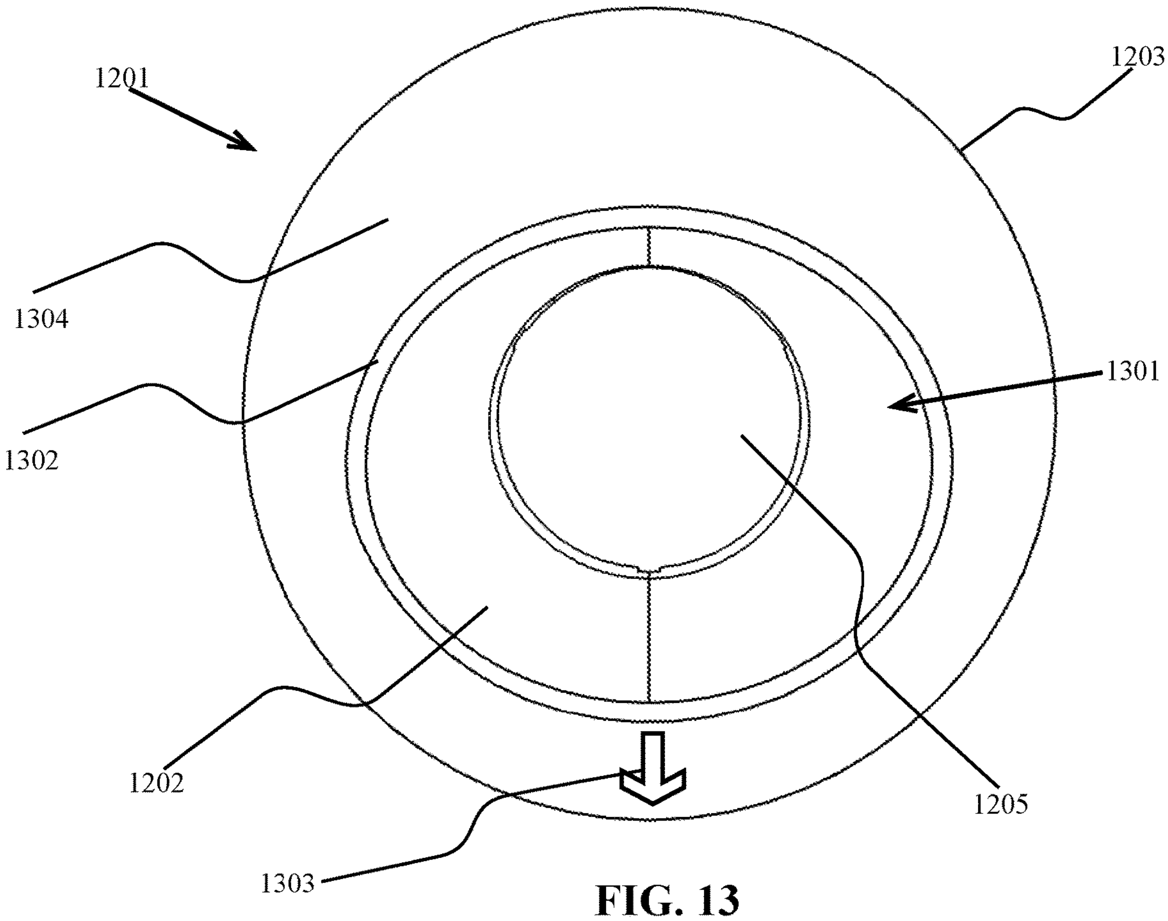
FIG. 13 is a diagram that illustrates a view into the asymmetrical cone of the wall wash insert, according to some aspects.

FIG. 13 is a diagram that illustrates a view into the asymmetrical cone 1202 of the removable wall wash insert 1201, according to some aspects. The narrow end of the asymmetrical cone 1202 and the wall wash diffuser 1205 may be circularly symmetric around the fixture axis 1102. The wide end 1301 of the asymmetrical cone 1202 is not circularly symmetric around the fixture axis. The wide end 1301 of the asymmetrical cone 1202 may be an oval having a center that is offset from the fixture axis. A wall wash flange 1304 is between the wide end 1301 and the insert rm 1203 of the wall wash insert 1201. The wide end 1301 can terminate in a wall wash step 1302 that is the same size as the opening of a wall wash faceplate and that extends above the wall wash flange 1304. As such, the bottom of a wall wash faceplate may rest against the wall wash flange 1304 while the top of the wall wash faceplate may be level with the top edge of the wall wash step 1302. A light direction arrow 1303 may be molded into the wall wash insert 1201. The light direction arrow 1303 indicates the direction that light from the LEDs is directed by the wall wash insert.

Figure 14:
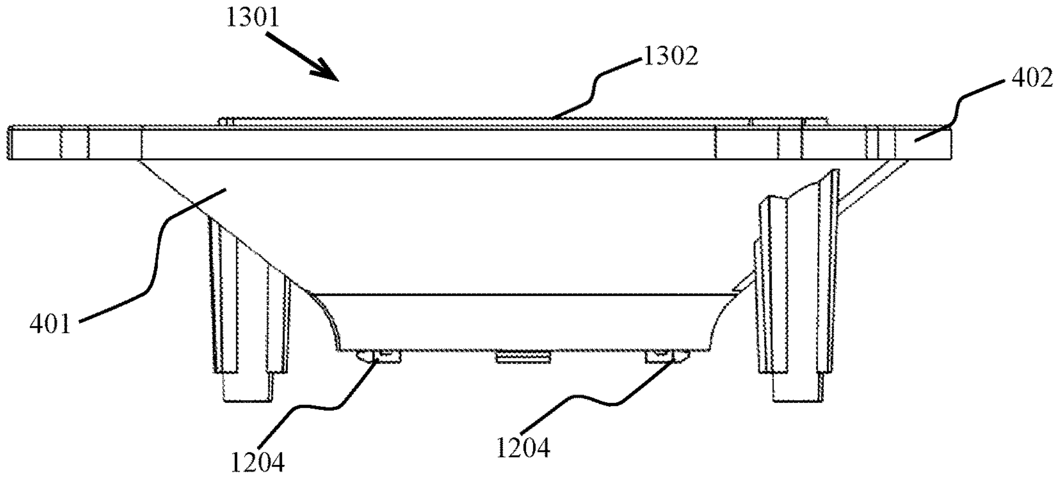
FIG. 14 is a diagram that illustrates a wall wash insert installed in a body, according to some aspects.
Figure 15:
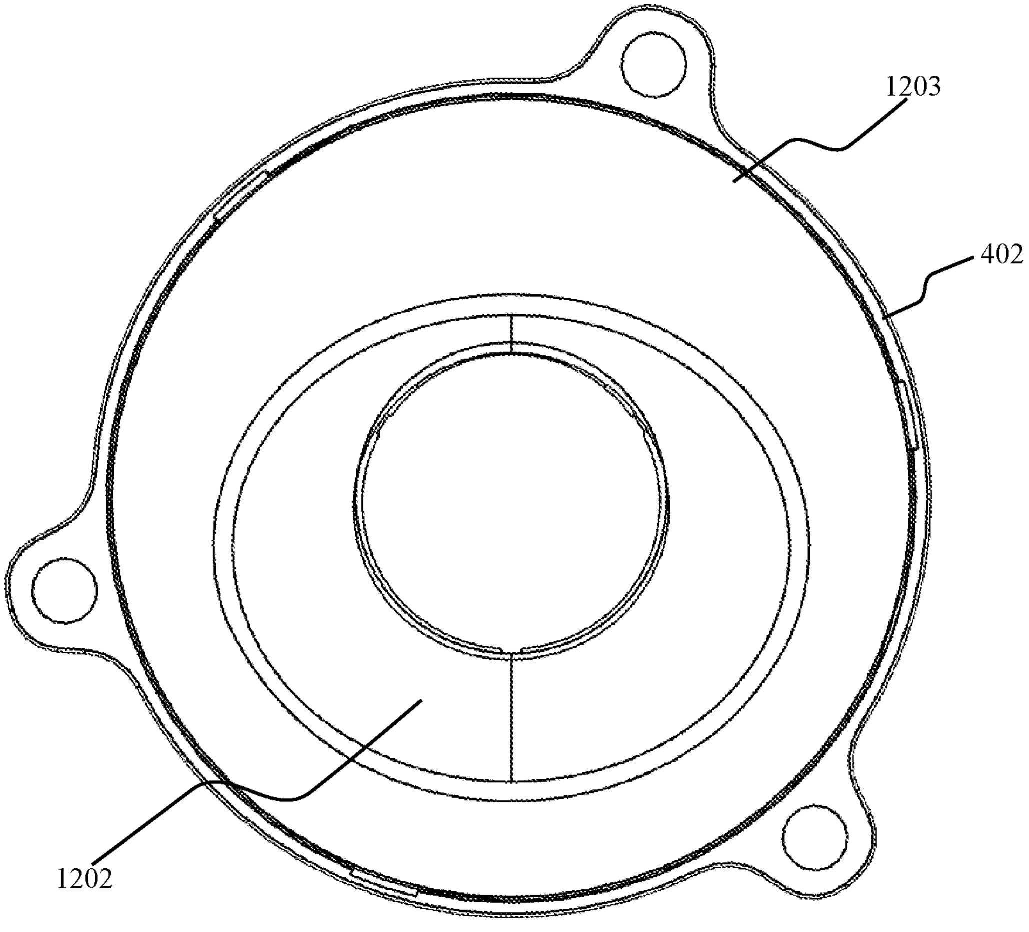
FIG. 15 is a diagram that illustrates a view into the asymmetrical cone of a wall wash insert that is installed in a body, according to some aspects.

FIG. 14 is a diagram that illustrates a removable wall wash insert 1201 installed in a body 401, according to some aspects. FIG. 15 is a diagram that illustrates a view into the asymmetrical cone of a removable wall wash insert that is installed in a body, according to some aspects. The body clips 1204 are engaging the bottom end 407 of the body 401. The wide end of the asymmetrical cone 1202 extends past the body flange 402. The insert rim 1203 is in the body ridge 408 of the body flange 107 and the removable wall wash insert is therefore rotatably installed in the body 401. Rotating the removable wall wash insert inside the body moves the asymmetrical lighting pattern. For example, rotating the removable wall wash insert inside the body can move the asymmetrical lighting pattern in a circle around the fixture axis. The wall wash insert is a removable wall wash insert because it is interchangeable with the top diffuser while the light fixture 100 remains installed in the ceiling or junction box. Here, removing the faceplate is not considered to be uninstalling the lighting fixture.

Figure 16:
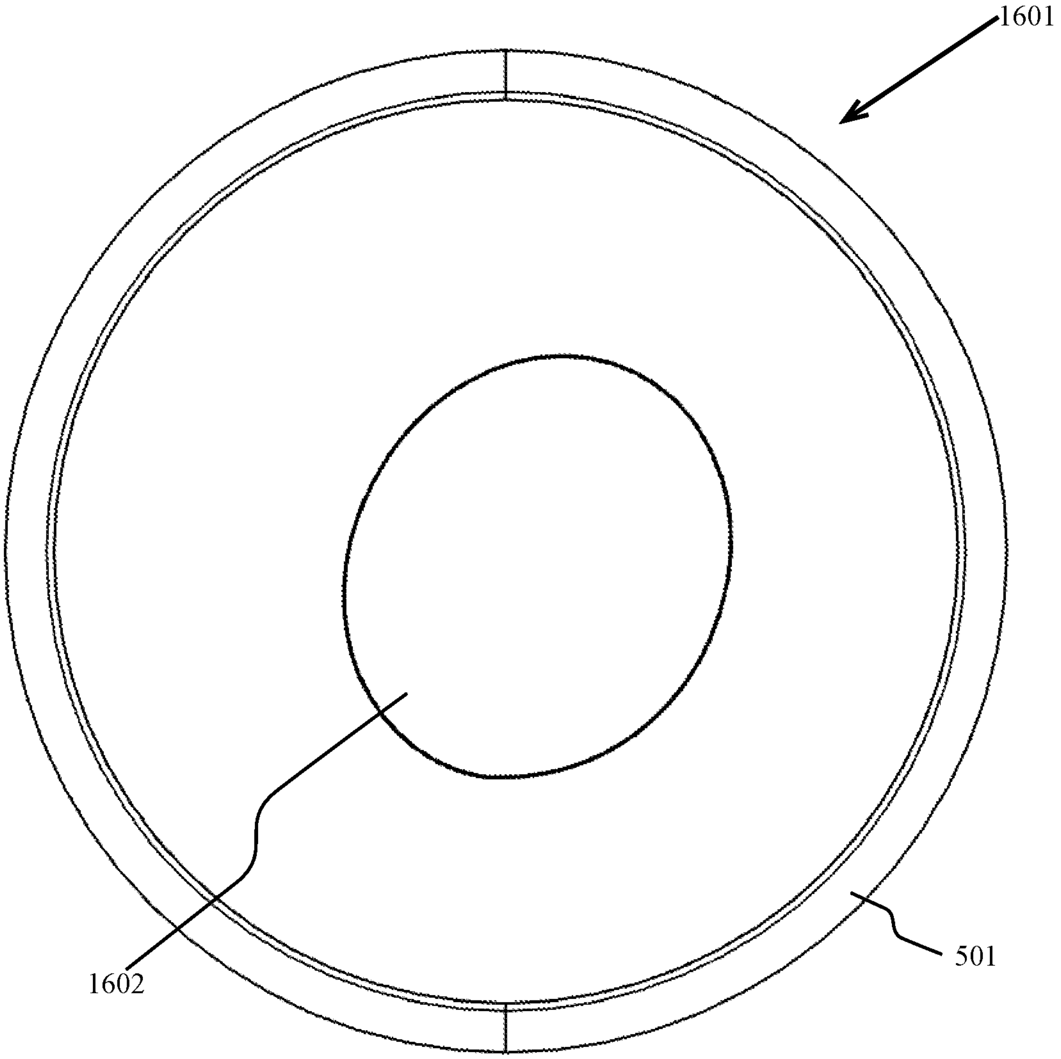
FIG. 16 is a diagram that illustrates a wall wash faceplate, according to some aspects.

FIG. 16 is a diagram that illustrates a wall wash faceplate 1601, according to some aspects. The wall wash faceplate 1601 has a wall wash lighting aperture 1602 that is oval shaped and that is offset from the fixture axis 1102 when the wall wash faceplate 1601 is installed. The wall wash lighting aperture 1602 can be the same size and shape as the wide end 1301 of the wall wash insert 1201. The wall wash lighting aperture 1602 can be positioned such that the center of the wall wash lighting aperture 1602 is at the center of the wide end 1301 of the wall wash insert 1201. The wall wash lighting aperture can be sized such that the wall wash step fits into the wall wash lighting aperture and the outside edge of the wall wash step is flush against the inside edge of the wall wash lighting aperture 1602.

Figure 17:
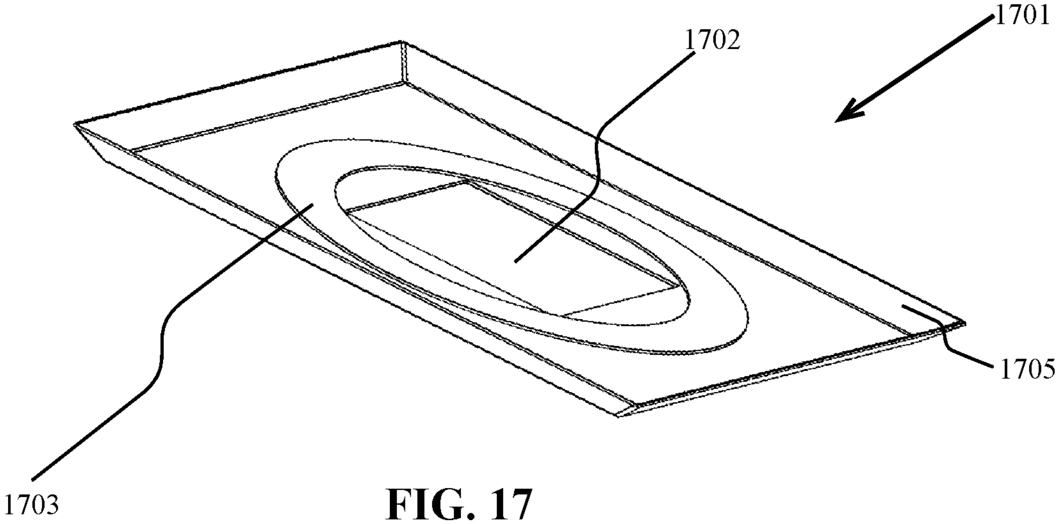
FIG. 17 is a diagram that illustrates a top side offset view of a square faceplate, according to some aspects.
Figure 18:
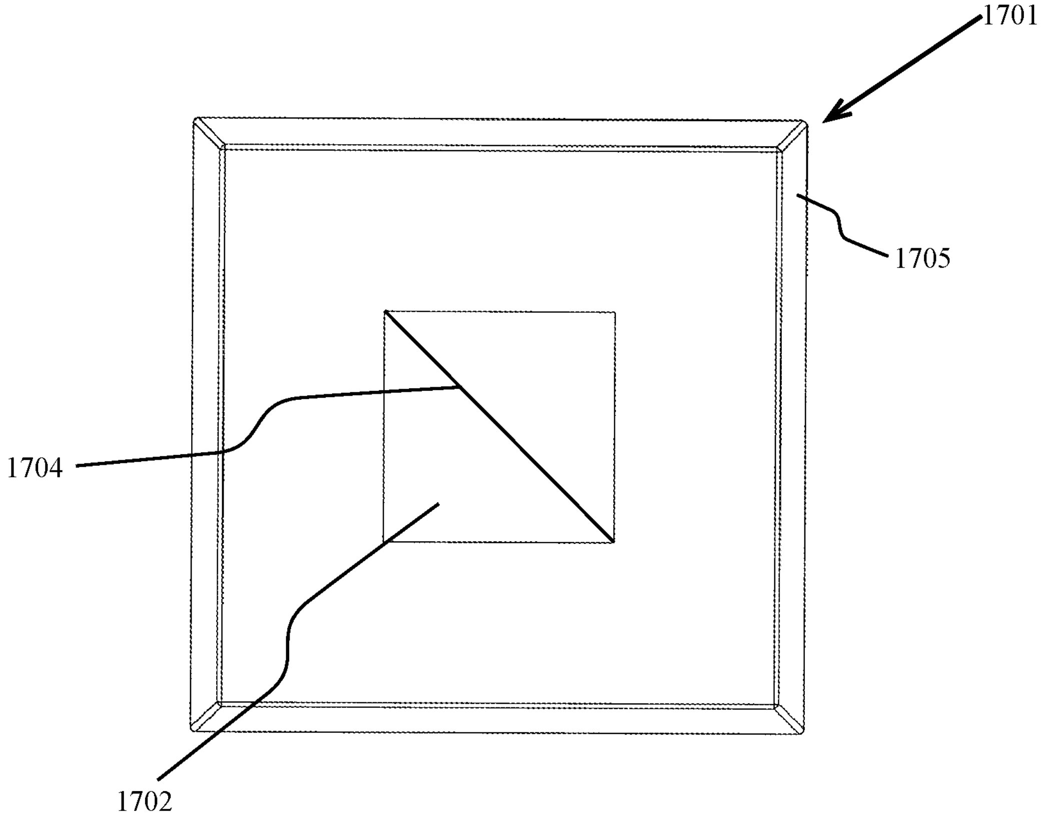
FIG. 18 is a diagram that illustrates a bottom view of a square faceplate, according to some aspects.

FIG. 17 is a diagram that illustrates a top side offset view of a square faceplate 1701, according to some aspects. FIG. 18 is a diagram that illustrates a bottom view of a square faceplate 1701, according to some aspects. The square faceplate 1701 has a square faceplate rim 1705 and a square lighting aperture 1702. The square lighting aperture 1702 is sized and positioned such that the top diffuser 103 has a diameter that is longer than a bisecting diagonal 1704 of the square lighting aperture 1702. The bisecting diagonal 1704 is a line between nonadjacent corners of the square lighting aperture 1702. The square faceplate 1701 may have a magnetically attractive ring 1703. For example, the square faceplate may be aluminum with a steel magnetically attractive ring 1703 such that the square faceplate can be magnetically attached to the lighting fixture. The magnetically attractive ring 1703 is ring shaped so that the square faceplate 1701 can be rotated around the fixture axis to thereby align the square faceplate with other architectural elements such as walls and other fixtures. It is therefore unnecessary to align the housing with the other architectural elements during installation.

The faceplate 102, wall wash faceplate 1601, and square faceplate 1701 are interchangeable faceplates. Faceplates are interchangeable when a first one of the interchangeable faceplates can be pulled free of the lighting fixture and a second one of the interchangeable faceplates can be attached to the lighting fixture. Here, magnetic attachment of the faceplates makes it particularly easy to swap faceplates.

Figure 19:
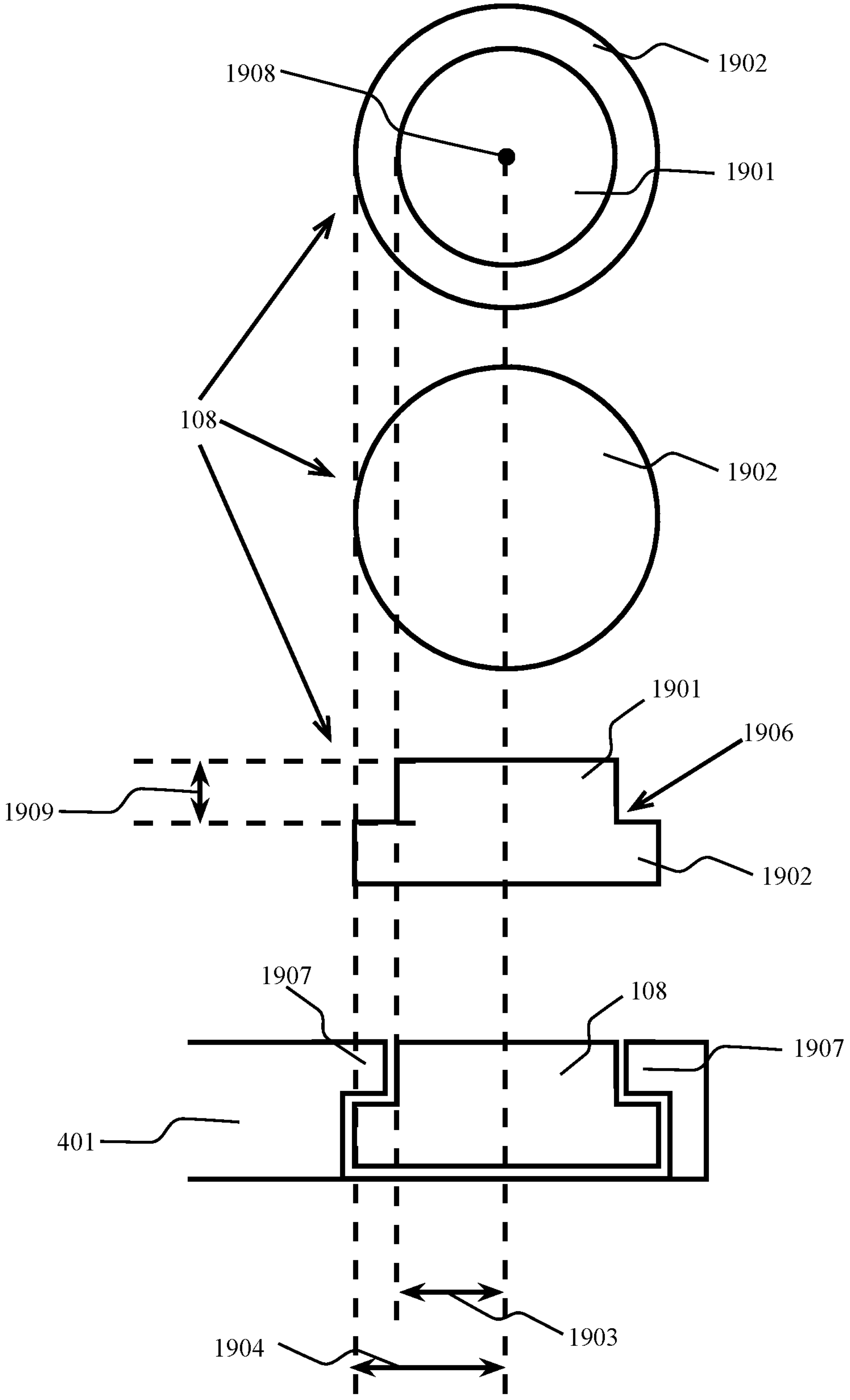
FIG. 19 is a diagram that illustrates a magnet for magnetically attaching a faceplate to the lighting fixture, according to some aspects.

FIG. 19 is a diagram that illustrates an example of a magnet 108 for magnetically attaching a faceplate to the lighting fixture, according to some aspects. The magnet 108 has a wide magnet section 1902 and a narrow magnet section 1901. The magnet 108, the wide magnet section 1902, and the narrow magnet section 1901 are circularly symmetric about a magnet axis 1908. The narrow magnet section 1901 of the magnet 108 has a first magnet radius 1903. The wide magnet section 1902 of the magnet 108 has a second magnet radius 1904. The second magnet radius 1904 is greater than the first magnet radius 1903 resulting in a stepped profile 1906. The magnet holder 403 has a magnet holder inner flange 1907 that can have a thickness matching the narrow section thickness 1909 such that the top of the magnet is flush with the body 401 when the magnet 108 is in the magnet holder 403.

Figure 20:
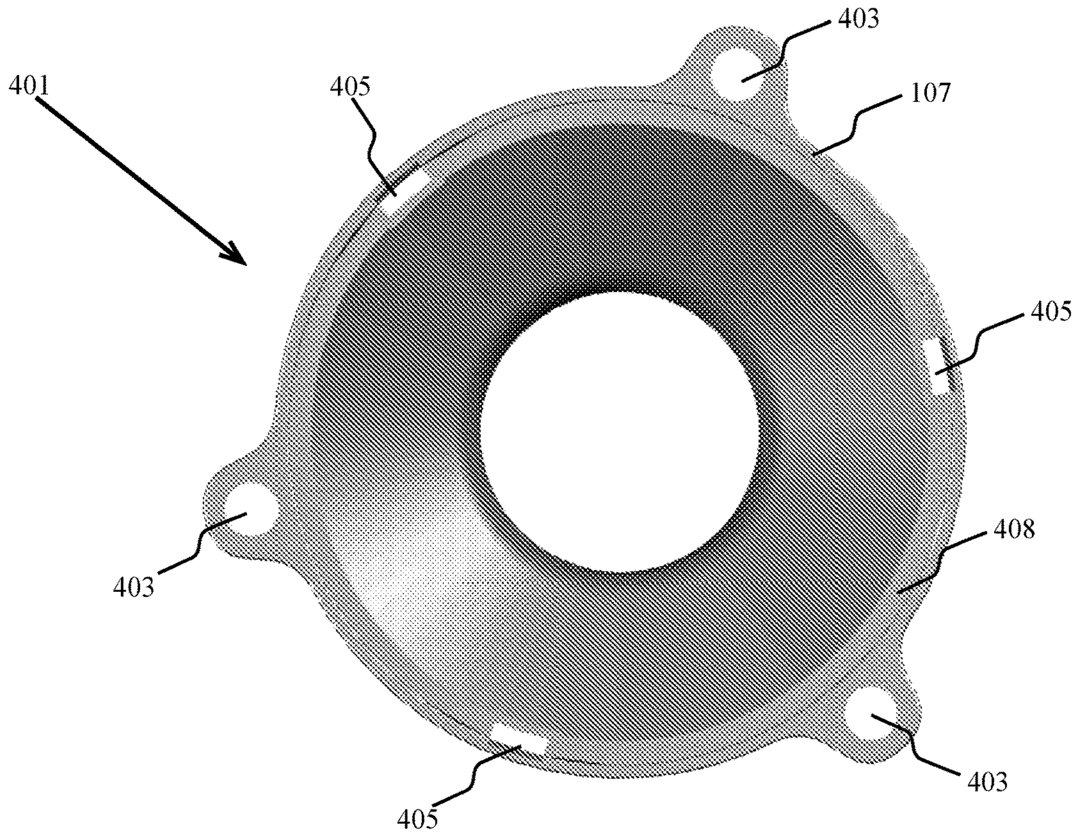
FIG. 20 is a diagram that illustrates a view into the body, according to some aspects.

FIG. 20 is a diagram that illustrates a view into the body 401, according to some aspects. The body 401 has three diffuser indents 405. The diffuser indents 405 can be equally spaced on the body flange 107 and body ridge 408.

Figure 21:
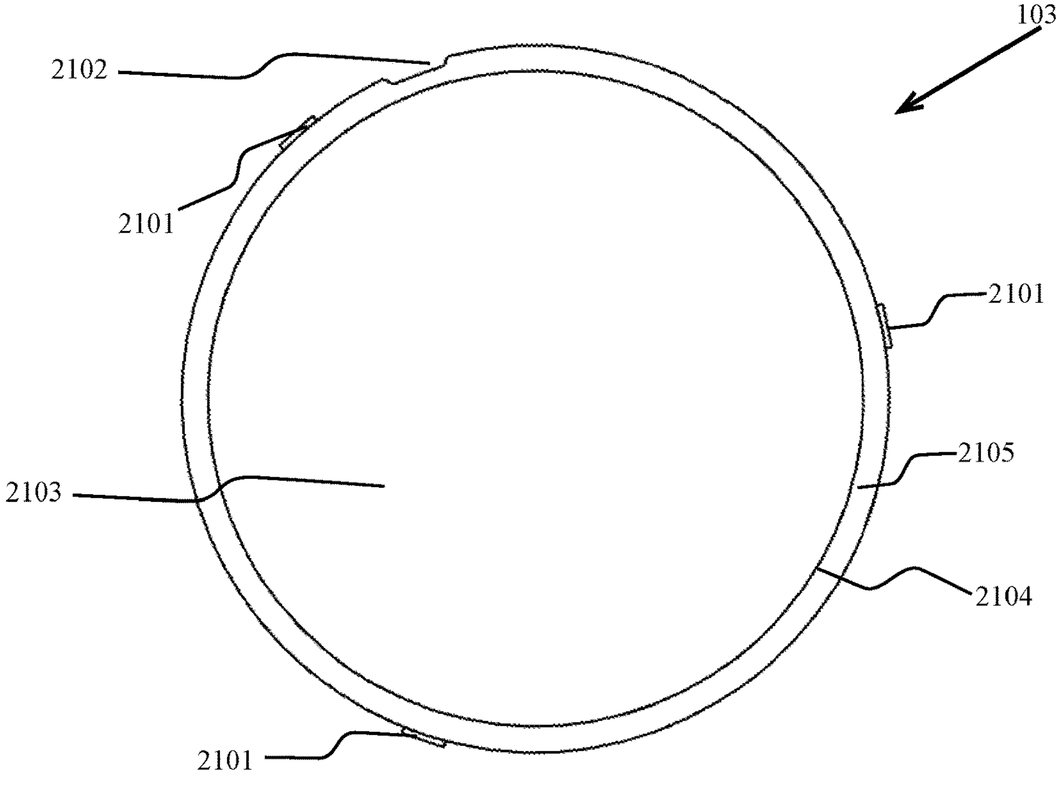
FIG. 21 is a diagram that illustrates a top view of a top diffuser, according to some aspects.

FIG. 21 is a diagram that illustrates a top view of a top diffuser 103, according to some aspects. The top diffuser 103 has three top diffuser tabs 2101 positioned to fit into the diffuser indents 405 of the body 401. A top diffuser breach 2102 is formed into the outside edge of the top diffuser 103. The top diffuser 103 may be removed from the body 401 by inserting a tool, such as a screw driver, into the top diffuser breach 2102 and using the tool to pull the top diffuser 103 free. The top diffuser 103 has a raised diffuser center 2103 surrounded by a diffuser rim 2105. The raised diffuser center 2103 and the diffuser rim 2105 meet at the raised center edge 2104. The raised diffuser center 2103 can fit into the lighting aperture 201 of a faceplate 102. When the faceplate 102 is installed, the diffuser rim can be flush against the faceplate flat inner surface 601 while the top of the raised center is level is level with the faceplate flat outer surface 503.

Figure 22:
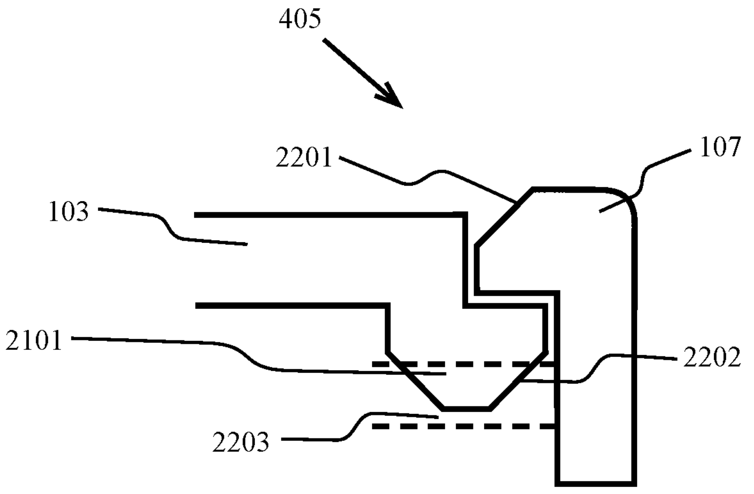
FIG. 22 is a diagram that illustrates a diffuser indent, according to some aspects.

FIG. 22 is a diagram that illustrates a diffuser indent 405, according to some aspects. The top diffuser tab 2101 of top diffuser 103 has a diffuser wedge 2202. A body wedge 2201 is formed into the body flange 107 at the location of a diffuser indent 405. The diffuser wedge 2202 and the body wedge 2201 are angled such that the diffuser wedge slides on the body wedge when the top diffuser is pressed into the body. The top diffuser tab 2101 therefore bends inward as the top diffuser is pressed into the body until the top diffuser is pressed fully into the body. The top diffuser tab engages the body flange when the top diffuser is pressed fully into the body, at which point the top diffuser is installed in the body. As can be seen in FIG. 20, the body ridge 408 can have body ridge openings at the diffuser indent 405 locations. A body ridge opening 2203 can provide access to the top diffuser tab 2101 and can also be a space into which a portion of the top diffuser tab is located when the top diffuser is installed, thereby allowing for a thinner exposed portion of the lighting fixture. The exposed portion of the lighting fixture is the portion that is visible when the lighting fixture is installed in a ceiling, wall, or other surface.

Figure 23:
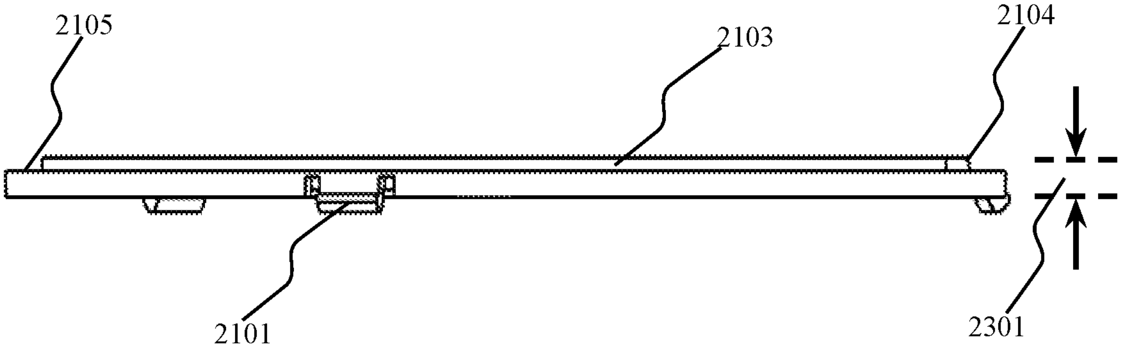
FIG. 23 is a diagram that illustrates a side view of a diffuser, according to some aspects.

FIG. 23 is a diagram that illustrates a side view of a diffuser, according to some aspects. As discussed above, the body and the circuit board are designed such that the top diffuser can be thinner than is possible with other designs. By being thinner, the diffuser is also more transparent. The lighting fixture thereby more efficient. In one example of a product that can obtain a UL certification, the top diffuser has a diffuser thickness 2301 of 2.7 mm.

Figure 24:
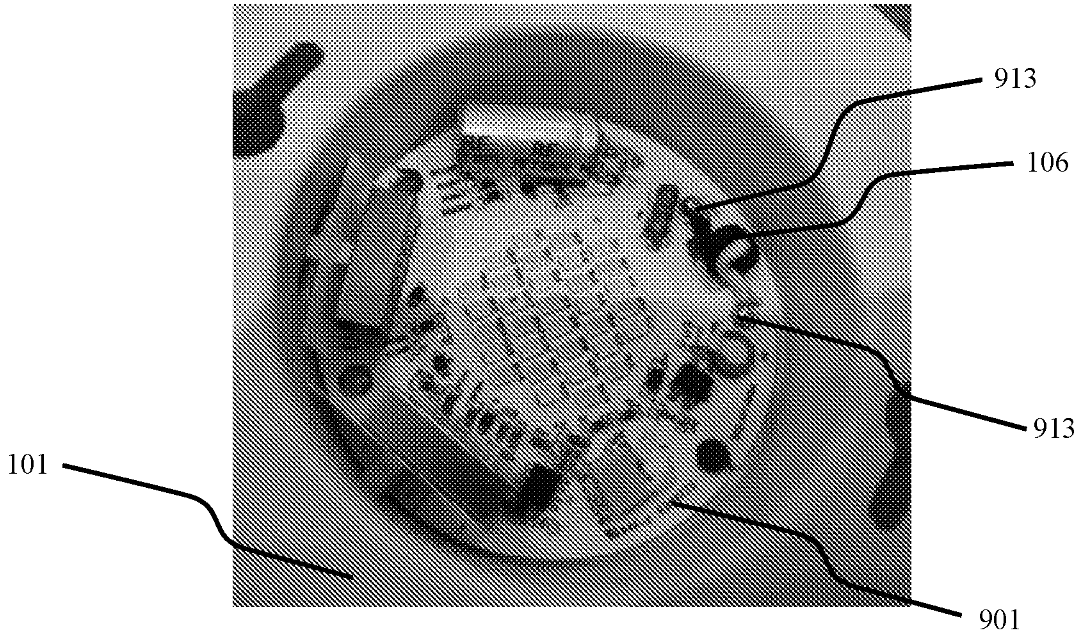
FIG. 24 is a photograph showing a circuit board that is populated and that is in a housing, according to some aspects.
Figure 25:
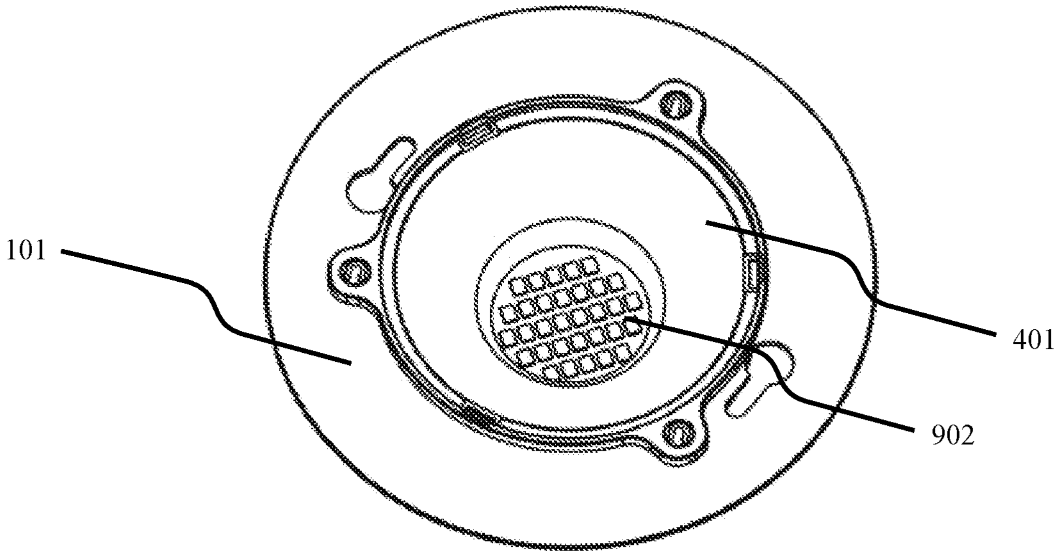
FIG. 25 is a diagram that illustrates a body and a circuit board in a housing, according to some aspects.

FIG. 24 is a photograph showing a circuit board 901 that is populated and that is in a housing 101, according to some aspects. FIG. 25 is a diagram that illustrates a body 401 and a circuit board 901 in a housing 101, according to some aspects. The LEDs 902 are mounted in the center of the circuit board 901. The other circuit components can be seen mounted away from the center of the circuit board. The power lines 106 have entered through a hole in the back of the housing and are soldered to the power input pads 913. In FIG. 25, the body is installed over the circuit board. FIG. 25 shows that the circuit components other than the LEDs are shielded by the body 401. In the examples of FIG. 9. FIG. 24, and FIG. 25, the other circuit components include the capacitor, the fuse, and the integrated circuit. The capacitor, the fuse, and the integrated circuit are shielded by the body because the capacitor, the fuse, and the integrated circuit are located between the body and the circuit board.

Figure 26:
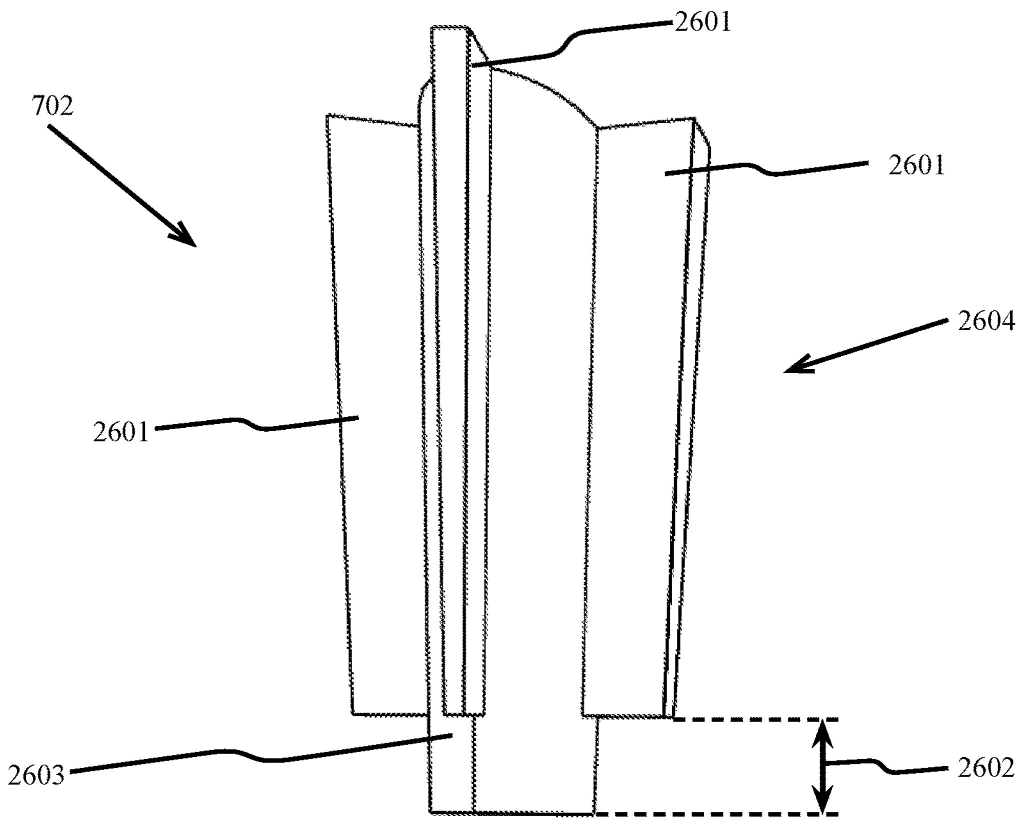
FIG. 26 is a diagram that illustrates a side view of a circuit board standoff, according to some aspects.
Figure 27:
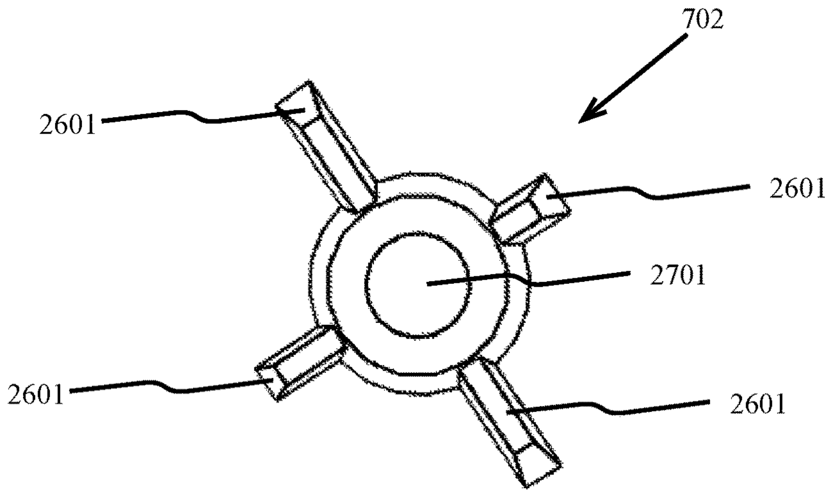
FIG. 27 is a diagram that illustrates a bottom view of a circuit board standoff, according to some aspects.

FIG. 26 is a diagram that illustrates a side view of a circuit board standoff 702, according to some aspects. FIG. 27 is a diagram that illustrates a bottom view of a circuit board standoff 702, according to some aspects. The body 401 is can be molded as a single piece that includes the circuit board standoffs. The illustrated example of the circuit board standoff 702 has four standoff fins 2601 that extend along a standoff finned section 2604 from the body 401 to the standoff bottom section 2603. The standoff bottom section 2603 can fit into the circuit board mounting holes 909. Screws passing through the back of the housing 101 can be threaded into the standoff mounting hole 2701 to thereby attach both the body 401 and the circuit board 901 to the housing. The standoff bottom section length 2602 can be the thickness of the circuit board. As such, the bottom ends of the standoff fins can press the circuit board against the housing. Such a circuit board mounting is possible because the circuit board is a single sided circuit board.

Figure 28:
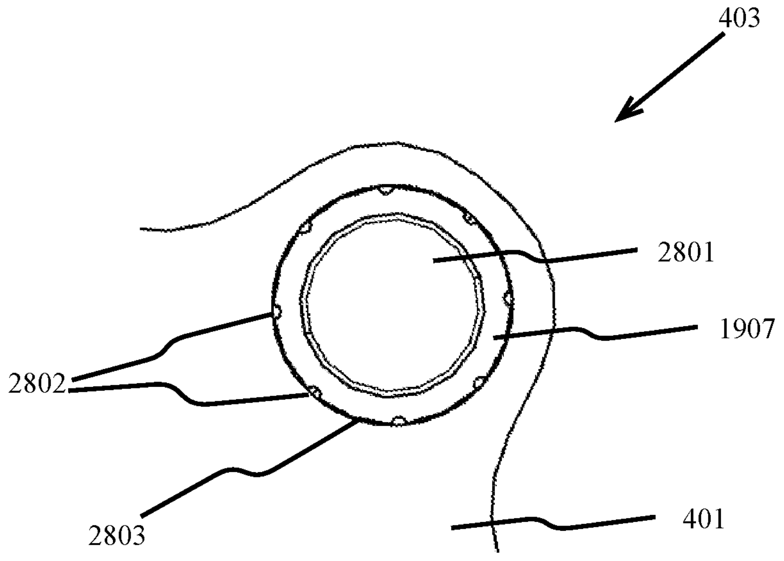
FIG. 28 is a diagram that illustrates magnet holder, according to some aspects.

FIG. 28 is a diagram that illustrates magnet holder 403, according to some aspects. The magnet holder 403 has a magnet holder clear opening 2801 into which the narrow magnet section 1901 can fit. The wide magnet section 1902 cannot fit into the magnet holder clear opening 2801 but instead may be flush against the magnet holder inner flange 1907. The magnet holder outside edge 2803 may be size to provide a friction fit for the wide magnet section 1902. A friction fit allows the magnet to be forced into the magnet holder after which static friction holds the magnet in place. Alternatively, magnet grippers 2802 may be formed in the outside edge 2803. The magnet grippers also provide a friction fit but may be deformed when the magnet is installed. Magnet grippers 2802 allow for variations in the sizes of the magnets because the magnet grippers deform.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A system comprising:
a housing;
a body attached to the housing and including a plurality of body wedges;
a plurality of light emitting diodes located inside the housing and at a bottom end of the body, the light emitting diodes configured to emit light that reflects from an inner surface of the body and out of a top end of the body;
a top diffuser that includes a plurality of diffuser wedges configured for removably attaching the top diffuser to the body; and
a removable wall wash insert that is interchangeable with the top diffuser and that is configured to attach a wall wash diffuser to the body,
wherein:
the diffuser wedges and the body wedges are angled such that the diffuser wedges slide on the body wedges when the top diffuser is pressed into the body;
the light produces a circularly symmetrical lighting pattern when the top diffuser is installed in the body; and
rotating the removable wall wash insert inside the body moves an asymmetrical lighting pattern.

2. The system of claim 1, further including:
a power selector switch configured to select one of a plurality of illumination levels of the light emitting diodes,
wherein:
the power selector switch includes a power selector switch body and a power selector actuator;
the power selector switch body is inside the housing.

3. The system of claim 1, wherein:
the body is formed from a material that meets UL94 5VA;
the body is a conical reflector body; and
the bottom end of the body is narrower than the top end of the body.

4. The system of claim 1, wherein:
the light emitting diodes are mounted on a circuit board;
the body includes a plurality of circuit board standoffs that include a standoff finned section, a standoff bottom section and a standoff mounting hole;
the standoff finned section includes a standoff fin;
the standoff bottom section passes through a circuit board mounting hole in the circuit board;
the standoff finned section is too large to pass through the circuit board mounting hole; and
the body is attached to the housing by a screw threaded into the standoff mounting hole.

5. The system of claim 1, further including:
a magnet that magnetically attaches a faceplate to the body; and
a magnet holder in the body that holds the magnet,
wherein:
the magnet is circularly symmetric about a magnet axis;
the magnet has a narrow magnet section and a wide magnet section;
the narrow magnet section is positioned in a magnet holder clear opening of the magnet holder; and
the wide magnet section is too large to fit into the magnet holder clear opening.

6. The system of claim 1, further including:
a first faceplate that magnetically attaches at the top end of the body; and
a second faceplate that magnetically attaches at the top end of the body,
wherein
the first faceplate and the second faceplate are interchangeable faceplates.

7. The system of claim 1, wherein the inner surface of the body is configured to reflect the light in the circularly symmetrical lighting pattern.

8. The system of claim 1, wherein:
the removable wall wash insert that includes a plurality of body clips configured for attaching the removable wall wash insert to the body;
the body clips are configured to attach the wall wash diffuser to the removable wall wash insert.

9. The system of claim 8, wherein:
the top diffuser includes a top diffuser breach and a plurality of top diffuser tabs that include the plurality of diffuser wedges;

wherein:

the top diffuser breach is configured for pulling the top diffuser free from the body;

the top diffuser tabs are configured for attaching the top diffuser to a plurality of diffuser indents in the body.

10. The system of claim 9, further including:

a power selector switch configured to select one of a plurality of illumination levels of the light emitting diodes;

a circuit board, the light emitting diodes mounted on the circuit board;

a plurality of interchangeable faceplates that magnetically attach at the top end of the body;

a magnet holder in the body that holds a magnet that is positioned to hold a one of the interchangeable faceplates to the top end of the body; and a body flange that is included in the body and that extends no more than 0.3 inches out of the housing, wherein:

the power selector switch includes a power selector switch body and a power selector actuator;

the power selector switch body is inside the housing;

the body is formed from a material that meets UL94 5VA;

the body is a conical reflector body;

the bottom end of the body is narrower than the top end of the body;

the body includes a plurality of circuit board standoffs that include a standoff finned section, a standoff bottom section and a standoff mounting hole;

the standoff finned section includes a standoff fin;

the standoff bottom section passes through a circuit board mounting hole in the circuit board;

the standoff finned section is too large to pass through the circuit board mounting hole;

the body is attached to the housing by a screw threaded into the standoff mounting hole;

the magnet is circularly symmetric about a magnet axis;

the magnet has a narrow magnet section and a wide magnet section;

the narrow magnet section is positioned in a magnet holder clear opening of the magnet holder;

the wide magnet section is too large to fit into the magnet holder clear opening; and the light emitted by the light emitting diodes passes through a lighting aperture in the one of the interchangeable faceplates when the one of the interchangeable faceplates is attached at the top end of the body.

11. A system comprising:

a housing;

a body attached to the housing and including a plurality of body wedges;

a bottom end of the body that is inside the housing;

a plurality of light emitting diodes configured to emit light that reflects from an inner surface of the body and out of a top end of the body;

a removable wall wash insert installed in the body and configured to produce an asymmetrical lighting pattern;

a top diffuser that is interchangeable with the removable wall wash insert and that includes a plurality of diffuser wedges, wherein:

rotating the removable wall wash insert inside the body moves the asymmetrical lighting pattern;

the diffuser wedges and the body wedges are angled such that the diffuser wedges slide on the body wedges when the top diffuser is pressed into the body;

the light produces a circularly symmetrical lighting pattern when the top diffuser is installed in the body.

12. The system of claim 11, further including:

a lighting circuit that includes the light emitting diodes;

a power selector switch that is electrically connected to the lighting circuit; and a color temperature selector switch that is electrically connected to the lighting circuit, wherein:

the power selector switch selects an illumination level of the light emitting diodes; and the color temperature selector switch selects a color of the light emitting diodes.

13. The system of claim 11, further including:

a faceplate that is magnetically attached at the top end of the body, wherein the light emitted by the light emitting diodes passes through a lighting aperture in the faceplate.

14. The system of claim 13, further including a magnet holder in the body that holds a magnet that attaches the faceplate to the body.

15. A system comprising:

a housing;

a body including a plurality of body wedges and attached to the housing with a bottom end of the body inside the housing;

a plurality of light emitting diodes configured to emit light that reflects from an inner surface of the body and out of a top end of the body; and a top diffuser that includes a plurality of diffuser wedges configured for removably attaching the top diffuser to the body; and a faceplate that is magnetically attached at the top end of the body, wherein:

the light emitted by the light emitting diodes passes through a lighting aperture in the faceplate;

the diffuser wedges and the body wedges are angled such that the diffuser wedges slide on the body wedges when the top diffuser is pressed into the body; and the inner surface of the body is configured to reflect the light in a circularly symmetrical lighting pattern.

16. The system of claim 15, further including a magnet holder in the body that holds a magnet that attaches the faceplate to the body.

17. The system of claim 15, further including:

a second faceplate that magnetically attaches at the top end of the body, wherein the faceplate and the second faceplate are interchangeable faceplates.

18. The system of claim 15, further including:

a removable wall wash insert that is interchangeable with the top diffuser and that is configured for installation into the body, wherein:

installing the removable wall wash insert into the body produces an asymmetrical lighting pattern; and rotating the removable wall wash insert inside the body moves the asymmetrical lighting pattern.

* * * * *